(12) United States Patent
Sato

(10) Patent No.: US 8,612,370 B2
(45) Date of Patent: Dec. 17, 2013

(54) PATTERN RECOGNITION DEVICE, PATTERN RECOGNITION METHOD, AND PATTERN RECOGNITION PROGRAM

(75) Inventor: Atsushi Sato, Tokyo (JP)

(73) Assignee: NEC Corporation, Tokyo (JP)

( * ) Notice: Subject to any disclaimer, the term of this patent is extended or adjusted under 35 U.S.C. 154(b) by 322 days.

(21) Appl. No.: 13/147,451

(22) PCT Filed: Feb. 2, 2010

(86) PCT No.: PCT/JP2010/051444
§ 371 (c)(1),
(2), (4) Date: Aug. 2, 2011

(87) PCT Pub. No.: WO2010/090189
PCT Pub. Date: Aug. 12, 2010

(65) Prior Publication Data
US 2011/0289028 A1 Nov. 24, 2011

(30) Foreign Application Priority Data

Feb. 3, 2009 (JP) ................................ 2009-022898

(51) Int. Cl.
*G06F 15/18* (2006.01)
(52) U.S. Cl.
USPC .......................................................... 706/12
(58) Field of Classification Search
USPC .......................................................... 706/12
See application file for complete search history.

(56) References Cited

U.S. PATENT DOCUMENTS

2008/0219565 A1* 9/2008 Hattori .......................... 382/224

OTHER PUBLICATIONS

G. Forman, "An Extensive Empirical Study of Feature Selection Metric for Text Classification", J. Mach. Learning Research 3 (2003), pp. 1289-1305.*

* cited by examiner

*Primary Examiner* — Kakali Chaki
*Assistant Examiner* — Vincent Gonzales
(74) *Attorney, Agent, or Firm* — Young & Thompson

(57) ABSTRACT

A pattern recognition device executes feature selection using a feature selection table. High recognition performance is possible by dimensionally lowering an n-dimensional feature vector. A feature selecting table generating section for generating a feature selecting table in a manner so that when features with up to $p^{th}$ priority (p·0) have been described in the feature selecting table, an additional feature selected from additional feature candidates for which no corresponding priorities have been assigned, among the n features, is added with $(p+1)^{th}$ priority. A recognition dictionary generating section determines the additional feature to be added with the $(p+1)^{th}$ priority and a (p+1)-dimensional reference vector having (p+1) features so that a loss (R) indicating risk that the input data is identified to be in a different class becomes minimum, notifies the determined additional feature to the feature selecting table generating section, and generates a recognition dictionary based on the (p+1)-dimensional reference vector.

18 Claims, 15 Drawing Sheets

Fig. 4

| FEATURE NUMBER | PRIORITY |
|---|---|
| 1 | 7 |
| 2 | 4 |
| 3 | N |
| 4 | 10 |
| 5 | 1 |
| 6 | 8 |
| 7 | 2 |
| ⋮ | ⋮ |
| N | 9 |

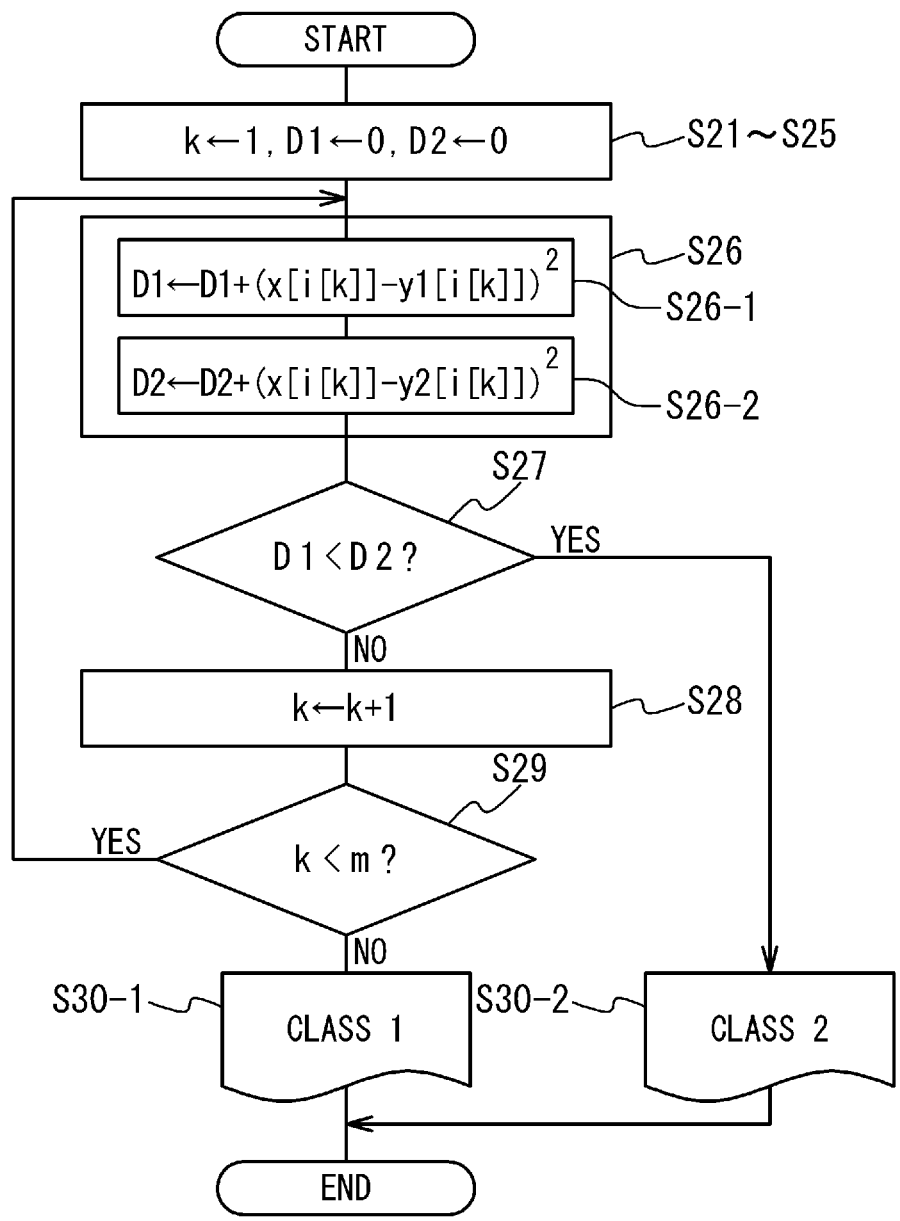

PATTERN RECOGNITION DEVICE, PATTERN RECOGNITION METHOD, AND PATTERN RECOGNITION PROGRAM

TECHNICAL FIELD

The present invention relates to a pattern recognition device, a pattern recognition method, and a pattern recognition program.

BACKGROUND ART

Examples of a pattern recognition device are described in non-patent literature 1 ("Easy-to-Understand pattern recognition", Ohmsha, Ltd, Ishii et al, Aug. 20, 1998, pp. 2-3), patent literature 1 (Japanese patent publication JP-P2002-259911A, Page 14 and FIG. 1), and non-patent literature 2 ("Recognition engineering—pattern recognition and application—", authored by Toriwaki, Inst of Television Engineers of Japan text series, CORONA PUBLISHING CO., LTD., Mar. 15, 1993, pp. 153-154).

FIG. 1 is a block diagram showing the pattern recognition device disclosed in non-patent literature 1. This pattern recognition device has a preprocessing section 101, a feature extracting section 102, a recognition calculation section 103, and a recognition dictionary 104. In this pattern recognition device, an inputted pattern is preprocessed by the preprocessing section 101. Only essential features that are necessary for recognition are extracted from the preprocessed pattern, by the feature extracting section 102. The recognition calculation section 103 checks the features extracted by the feature extracting section against the recognition dictionary 104 to output a class of the inputted pattern.

In order to execute precise recognition, which features are extracted from the inputted pattern is important.

In patent literature 1, a technology is described, whose purpose is to provide a pattern recognition device which enables to realize high recognition accuracy with using features of a lower dimension number. FIG. 2 is a block diagram showing a pattern recognition device described in patent literature 1. This pattern recognition device includes a data input section 201, a feature extracting section 202, a feature selecting section 203, a feature selecting dictionary 204, a feature selecting dictionary correcting section 205, a recognition dictionary correcting section 206, a recognition dictionary 207, a recognition section 208, and a result outputting section 209. The feature extracting section 202 extracts n-dimensional features from an inputted pattern or a learning pattern. The feature selecting section 203 consists of a first feature converting section which selects h-dimensional features from the n-dimensional features by a nonlinear function, and a second feature converting section which selects m-dimensional features from the h-dimensional features by a linear function or a nonlinear function. The recognition dictionary 204 consists of a group of m-dimensional reference patterns. The recognition section 208 checks m-dimensional features of the inputted pattern against the m-dimensional reference patterns to output recognition result of the inputted pattern. The feature selecting dictionary correcting section 206 corrects the recognition dictionary 207 at a time of learning, and the feature selecting dictionary correcting section 205 corrects the feature selecting dictionary 204 at the time of learning.

Furthermore, in patent literature 2, as an example of a method for selecting features, forward sequential selection is exemplified. In the forward sequential selection, when M features are selected from N features, a certain feature is firstly selected. Then feature amounts are sequentially added to that. For example, when a combination X(i−1) of "i−1" number features have been already selected, in order to select an i-th feature, a combination whose evaluation value of goodness is maximum is selected from a group of (n−i+1) combination which is obtained by adding each one of remained (n−i+1) features to the combination X(i−1).

Furthermore, as a related technology, the inventor could know patent literature 2 (Japanese patent publication JP-Heisei 10-55412A), patent literature 3(Japanese patent publication JP-P2001-92924A), patent literature 4(Japanese patent publication JP-P2002-251592A), patent literature 5(Japanese patent publication JP-P2006-153582A), and patent literature 6 (Japanese patent publication JP-Heisei 9-245125A).

CITATION LIST

Patent Literatures

[Patent Literature 1]: Japanese patent publication JP-P2002-259911A
[Patent Literature 2]: Japanese patent publication JP-Heisei 10-55412A
[Patent Literature 3]: Japanese patent publication JP-P2001-92924A
[Patent Literature 4]: Japanese patent publication JP-P2002-251592A
[Patent Literature 5]: Japanese patent publication JP-P2006-153582A
[Patent Literature 6]: Japanese patent publication JP-Heisei 9-245125A

Non-Patent Literatures

[non-patent literature 1]: "Easy-to-Understand pattern recognition", Ohmsha, Ltd, Ishii et al, Aug. 20, 1998, pp. 2-3
[non-patent literature 2]: "Recognition engineering—pattern recognition and application—", authored by Toriwaki, Inst of Television Engineers of Japan text series, CORONA PUBLISHING CO., LTD., Mar. 15, 1993, pp. 153-154

DISCLOSURE OF INVENTION

When features are selected according to the forward sequential selection in order to recognize a class of inputted data as described in Patent literature 2, a recognition performance may be decreased. This is because the recognition dictionary used in recognition is not necessary optimized for a dimension after feature selection. For example, if the recognition dictionary is optimized for a vector (n-dimensional vector) before dimension reduction, the dictionary is not necessarily optimized for a vector (m-dimensional vector) after the dimension reduction.

Accordingly, an object of the present invention is to provide a pattern recognition device, a pattern recognition method, and a pattern recognition program, which enable to precisely execute pattern recognition on a vector after the feature selection.

A pattern recognition device according to the present invention includes: a feature extracting section configured to extract n number of features from an inputted data to generate n-dimensional feature vector; a feature selecting section configured to select m (m<n) number of features from the n-dimensional feature vector based on a feature selecting table that indicates a relationship between features and priorities to generate m-dimensional feature vector; a recognition section configured to compare the m-dimensional feature vector with a recognition dictionary that includes reference vectors to recognize a class to which the m-dimensional feature vector belongs; a feature selecting table generating section configured to generate the feature selecting table; and a recognition dictionary generating section configured to generate the recognition dictionary. The feature selecting table generating section generates the feature selecting table, by assigning the respective priorities to the respective m features one by one according to an order of the priorities. When the priorities up to the p-th priority have been assigned to the features, the recognition dictionary generating section determines an additional feature to be assigned to (p+1)-th priority and (p+1)-dimensional reference vector having (p+1) features, such that loss R becomes minimum which indicates a degree of a risk where the inputted data is recognized to be in a wrong class. Then, the determined additional features are informed to the feature selecting table generating section, and the recognition dictionary is generated based on the determined (p+1)-dimensional reference vector.

A pattern recognition method according to the present invention includes: extracting n number of features from inputted data to generate n-dimensional feature vector; selecting m (m<n) number of features from the n-dimensional feature vector based on a feature selecting table representing a relationship between features and priorities to generate an m-dimensional feature vector; comparing the m-dimensional feature vector with a recognition dictionary including reference vectors to recognize a class to which the m-dimensional feature vector belongs; generating the feature selecting table; and generating the recognition dictionary. The generating the feature selecting table includes: assigning the respective priorities to the respective m features one by one according to an order of the priorities. The generating recognition dictionary includes: determining an additional feature to be assigned to (p+1)-th priority and (p+1)-dimensional reference vector having (p+1) features such that loss R becomes minimum which indicates a degree of a risk where the inputted data is recognized to be in a wrong class when the priorities up to the p-th priority have been assigned to the features; and generating the recognition dictionary based on the determined (p+1)-dimensional reference vector.

A pattern recognition program according to the present invention is a program for a computer executing a pattern recognition method, the method includes: extracting n number of features from inputted data to generate an n-dimensional feature vector; selecting m (m<n) number of features from the n-dimensional feature vector based on a feature selecting table representing a relationship between features and priorities to generate an m-dimensional feature vector; comparing the m-dimensional feature vector to a recognition dictionary including reference vectors to recognize a class in which the m-dimensional feature vector belongs; generating the feature selecting table; and generating the recognition dictionary. The generating the feature selecting table includes: assigning the respective priorities to the respective m features one by one according to an order of the priorities. The generating recognition dictionary includes: determining an additional feature to be assigned to (p+1)th priority and (p+1)-dimensional reference vector having (p+1) features such that loss R becomes minimum which indicates a degree of a risk where the inputted data is recognized to be in a wrong class when the priorities up to the p-th priority have been assigned to the features; and generating the recognition dictionary based on the determined (p+1)-dimensional reference vector.

According to the present invention, a pattern recognition device, a pattern recognition method, and a pattern recognition program are provided, which enable to precisely execute pattern recognition for a vector after feature selection.

BRIEF DESCRIPTION OF THE DRAWINGS

FIG. 4 is a concept diagram showing a feature selecting table;
FIG. 19 is a flowchart showing an operation of recognition in an example 2.

BEST MODE FOR CARRYING OUT THE INVENTION

With reference to the drawings, exemplary embodiments according to the present invention will be explained.

First Exemplary Embodiment

Figure 1:
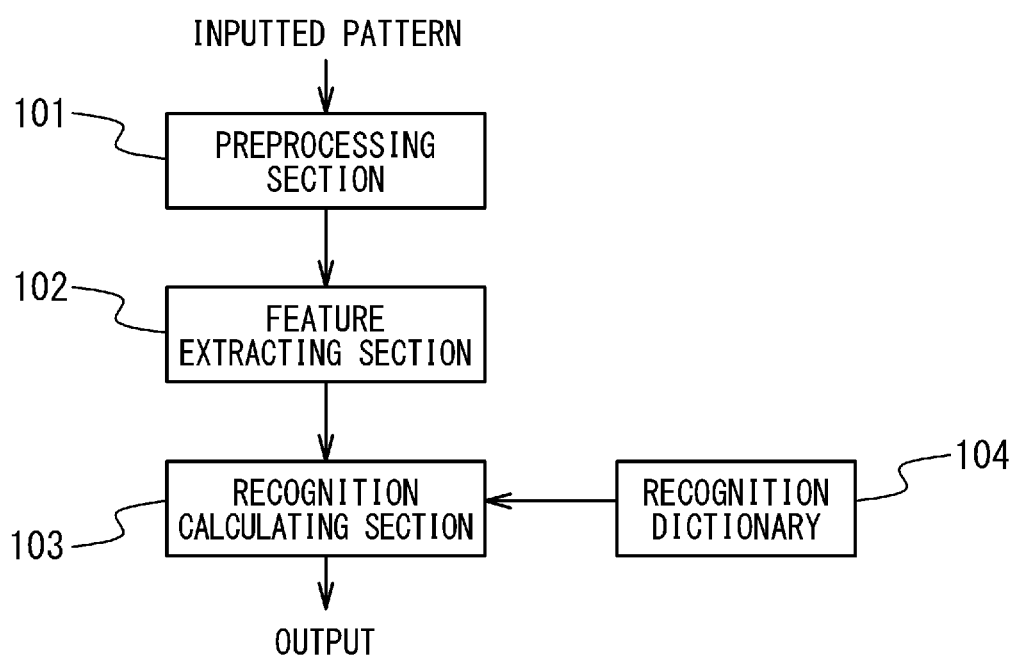
FIG. 1 is a block diagram showing a pattern recognition device according to a related technology.
Figure 2:
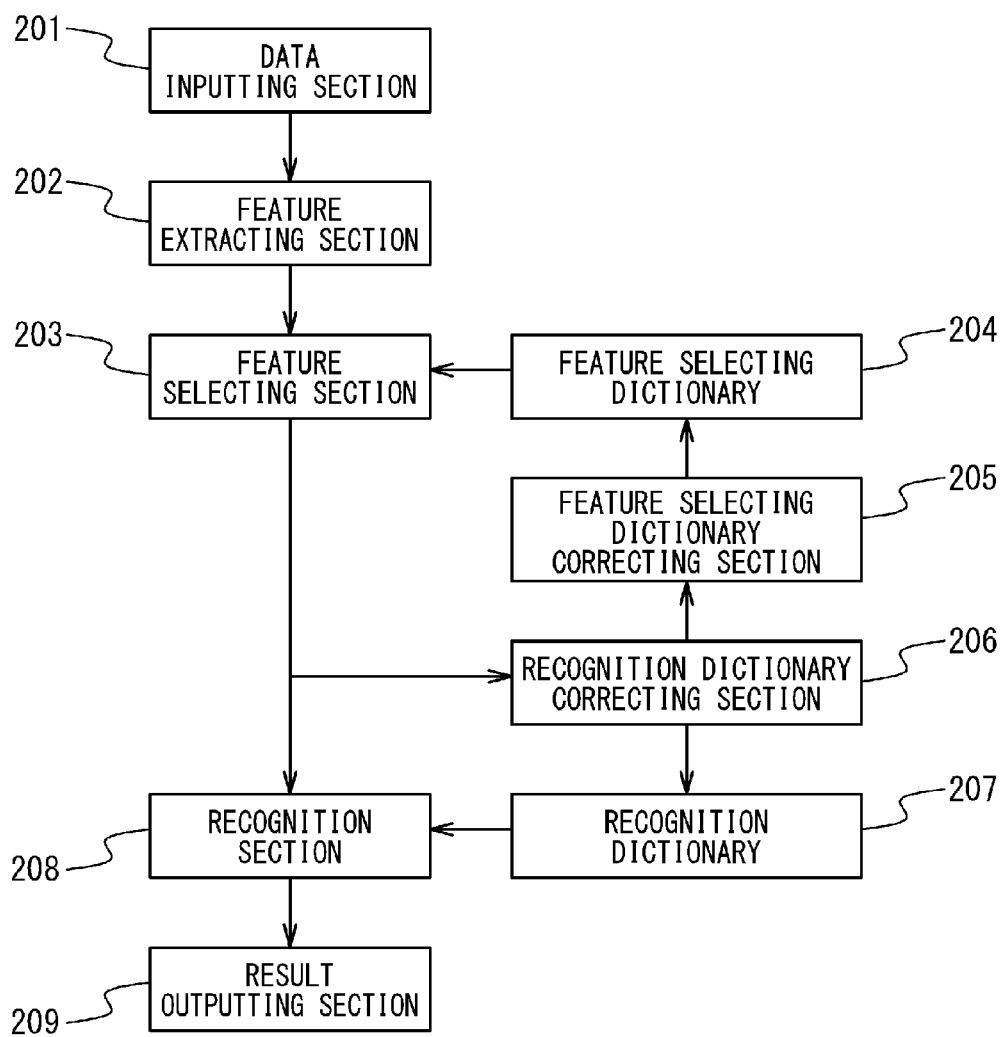
FIG. 2 is a block diagram showing a pattern recognition device according to a related technology.
Figure 3:
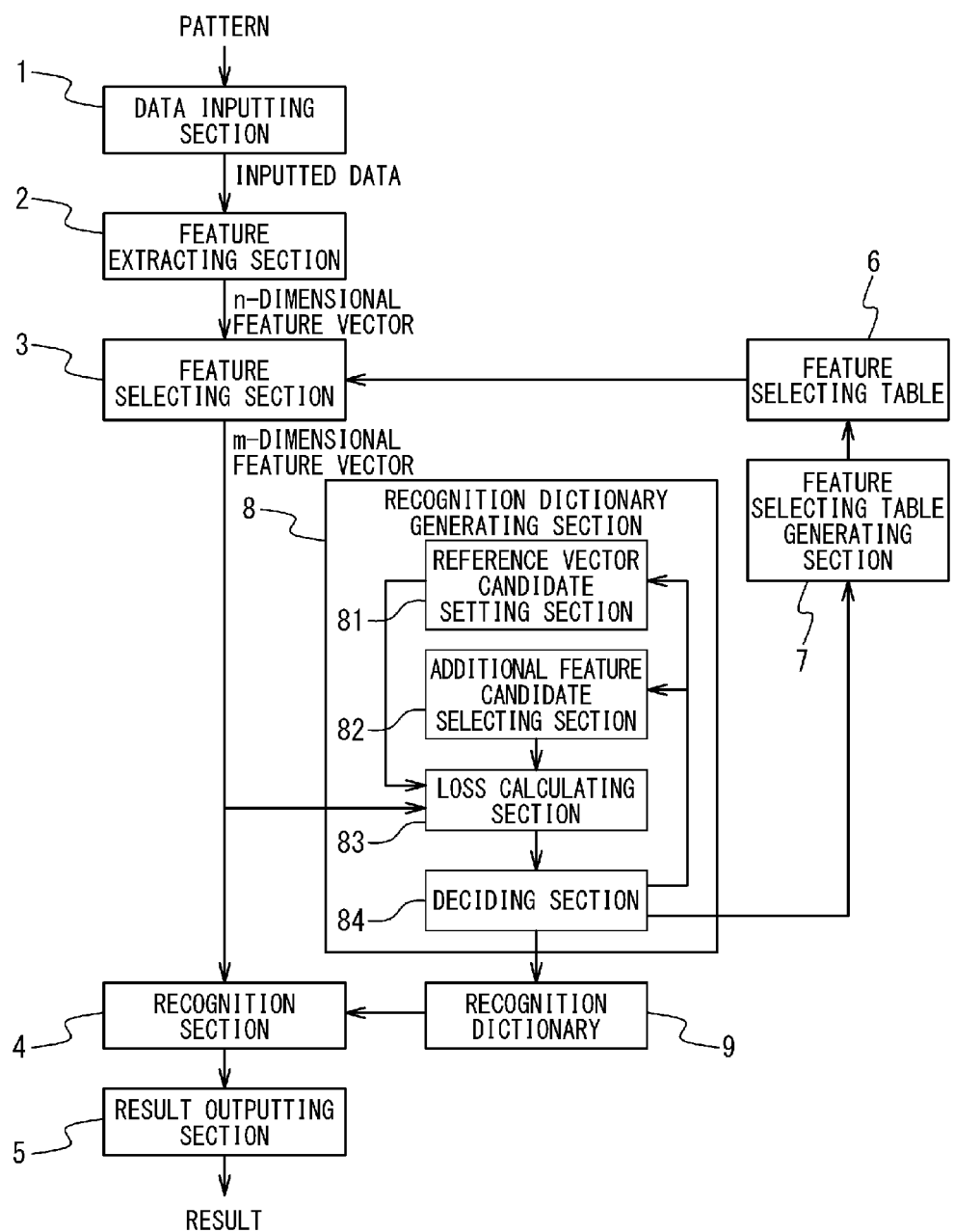
FIG. 3 is a block diagram showing a pattern recognition device according to a first exemplary embodiment.

FIG. 3 is a schematic block diagram showing a pattern recognition device according to the present exemplary embodiment. This pattern recognition device is a device for recognizing a class of recognition target data within a plurality of class. The pattern recognition device includes a data inputting section 1, a feature extracting section 2, a feature selecting section 3, a recognition section 4, a result outputting section 5, a feature selecting table 6, a feature selecting table generating section 7, a recognition dictionary generating section 8, and a recognition dictionary 9. This pattern recognition device is realized by a computer. The data inputting section 1, the feature extracting section 2, the feature selecting section 3, the recognition section 4, the result outputting section 5, the feature selecting table generating section 7, and recognition dictionary generating section 8 are realized by a CPU executing a pattern recognition program installed in a ROM (Read Only Memory) or the like. The feature selecting table 6 and the recognition dictionary 9 can be realized by data stored in a recording medium exemplified by a RAM (Random Access Memory) or a hard disk.

FIG. 4 is a concept diagram showing the feature selecting table 6. The feature selecting table 6 is a table for indicating priorities when features are selected. In the feature selecting table 6, a plurality of priority are assigned to a plurality of feature. Specifically, in the feature selecting table 6, a relationship between feature numbers for identifying features and priorities is described.

The recognition dictionary 9 includes an m-dimensional reference vector for the each class. The reference vector is a vector used for determining a class to which the recognition target data belongs.

The data inputting section obtains a recognition target pattern or a pattern for learning as inputted data, and outputs to the feature extracting section 2. As the inputted data, for example, image data captured by a camera or the like is exemplified.

The feature extracting section 2 extracts n number of features from the inputted data, and generates a vector (n-dimensional feature vector) having n features. For example, when the inputted data is image data, the feature extracting section 2 converts the image data into a black-and-white shading image, divides the black-and-white shading image into a plurality of region so as to have 10 regions in longitudinal and 10 regions in lateral, and calculating an average of a brightness value for each of the plurality of regions. As the result, 100-dimensional feature vector can be obtained.

The feature selecting section 3 converts the n-dimensional feature vector into m-dimensional (m<n) feature vector. Specifically, the feature selecting section 3 refers to the feature selecting table 6, selects m number of features from n number of features according to the priorities, and generates the m-dimensional feature vector.

The recognition section 4 refers to the recognition dictionary 9 to recognize a class to which the m-dimensional feature vector belongs.

The result outputting section 5 outputs the recognition result of the recognition section 4 to an output device such as a display device (for example, display).

The feature selecting table generating section 7 generates the feature selecting table 6.

The recognition dictionary generating section 8 generates the recognition dictionary 9. The recognition dictionary generating section 8 includes a reference vector candidate setting section 81, an additional feature candidate selecting section 82, a loss calculating section 83, and a deciding section 84.

Next, a pattern recognition method according to the present exemplary embodiment will be explained.

Figure 5:
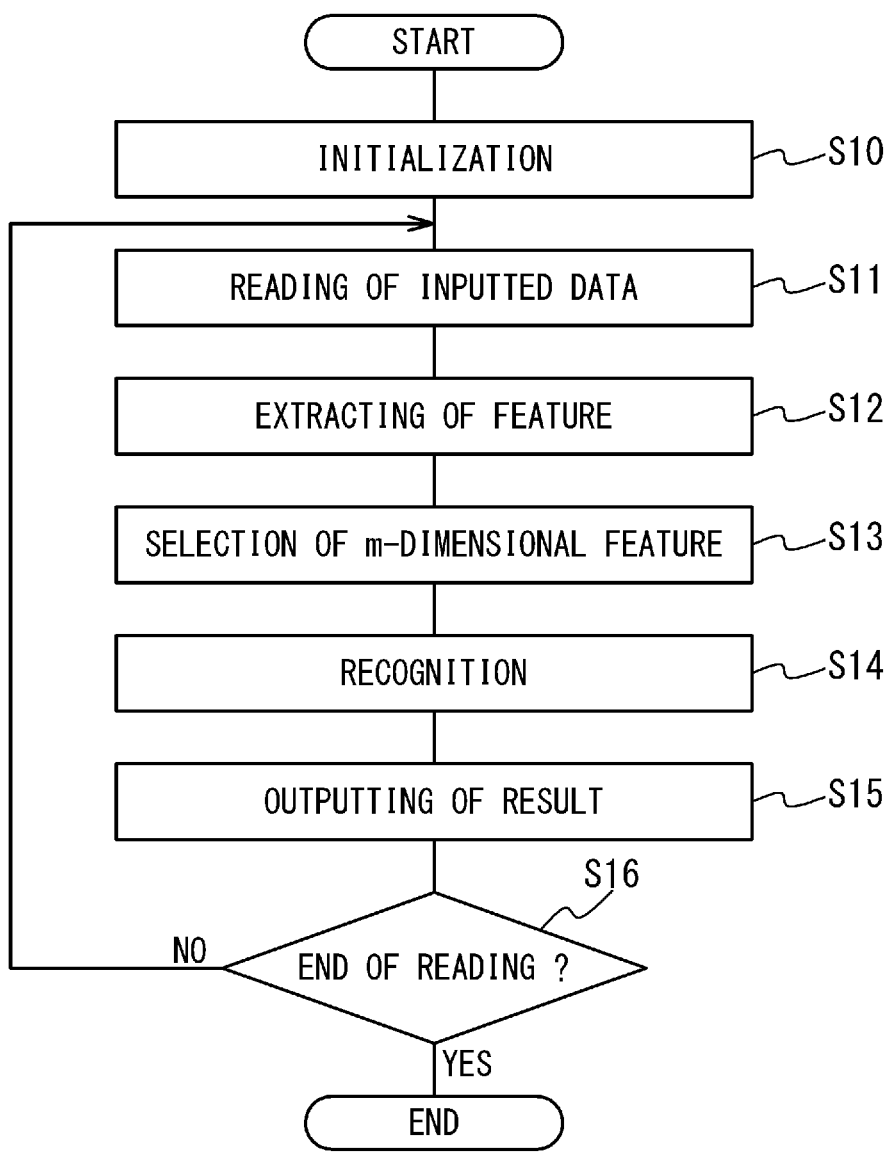
FIG. 5 is a flowchart showing an operation of recognition in the first exemplary embodiment.

At first, an operation of recognizing a class of the recognition target data will be explained. FIG. 5 is a flowchart showing an operation of recognition.

First of all, the feature selecting section 3 initializes the feature selecting table 6. Further, the recognition section 4 initializes the recognition dictionary 9. As the results, the feature selecting table 6 and the recognition dictionary 9 are set to be an operational state (Step S10). Next, the data inputting section 9 reads a recognition target pattern as inputted data (Step S11). The feature extracting section 2 extracts n number of features from the inputted data, and generates an n-dimensional feature vector (Step S12). The feature selecting section 3 selects m number of features from the n-dimensional feature vector based on the feature selecting table 6 to convert to an m-dimensional feature vector (Step S13). The recognition section 4 recognizes the m-dimensional feature vector with using the recognition dictionary 9. Specifically, the recognition section 4 compares the m-dimensional feature vector with an m-dimensional reference vector of the each class. Further specifically, the recognition section 4 calculates a degree of similarity between the m-dimensional feature vector and the each m-dimensional reference vector, based on a discriminate function that is previously prepared. The recognition section 4 decides a class, to which the m-dimensional feature vector is most similar, as a result of recognition, based on the calculated degree of similarity (Step S14). The result outputting section 5 outputs the recognition result of the recognition section 4 (Step S15). If all of recognition target patterns are processed, an entire operation will be finished. If there is another recognition target pattern, operations following Step S11 will be repeated (Step S16).

According to the method mentioned above, the feature selecting section 5 decreases dimensions based on the feature selecting table 6. In this time, the feature selecting section 5 only have to select m number of features from the n-dimensional feature vector according to the priorities. Namely, since the number of features used for the operation is m in the n number of features of the n-dimensional feature vector, a calculation amount for feature selection can be reduced.

Here, in order to accurately execute the feature selection (reduction of dimensions) and recognition of a class, the feature selecting table 6 and the recognition dictionary 9 must be accurately generated. Accordingly, in the present exemplary embodiment, operations of generating the feature selecting table 6 and the recognition dictionary 9 are devised.

Figure 6:
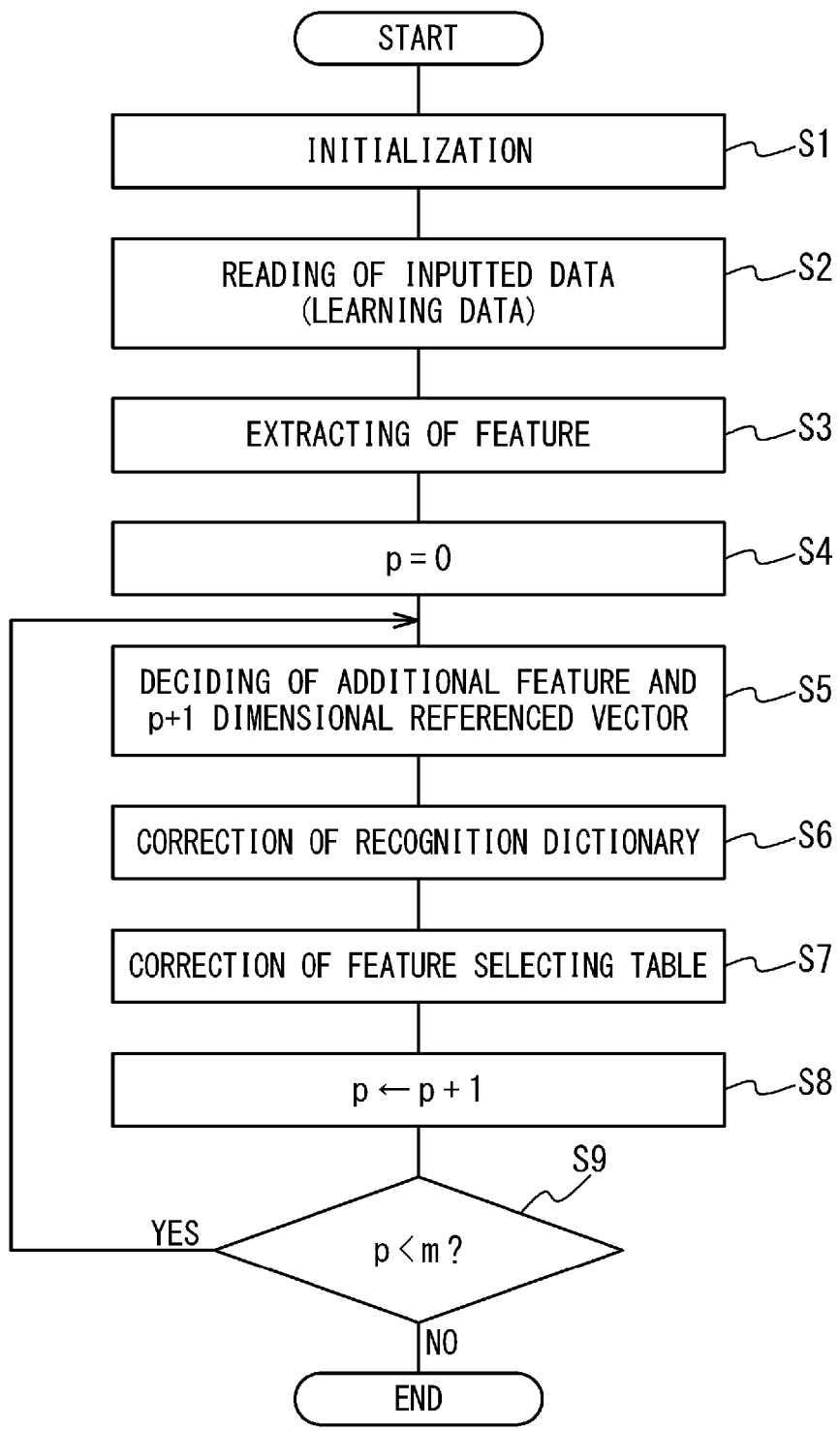
FIG. 6 is a flowchart showing an operation of learning in the first exemplary embodiment.

The operations of generating the feature selecting table 6 and the recognition dictionary 6 will be explained blow. FIG. 6 is a flowchart showing an operation of learning.

Step S1; Initialization

At first, a plurality of data for learning are prepared. Each of the plurality of data for learning is data whose class is known. Furthermore, the feature selecting table 6 and the recognition dictionary 9 are initialized. Namely, the feature selecting table 6 and the recognition dictionary 9 are set to be in an operational state.

Step S2; Reading of Inputted Data

Next, the data inputting section 1 reads each data for learning as inputted data.

Step S3; Extracting of Features

The feature extracting section 2 extracts n number of features from the read inputted data, and generates an n-dimensional feature vector (hereinafter, called as an n-dimensional learning vector).

Step S4; Initialization of p

Subsequently, the feature selecting table generating section 7 sets value p, which indicates a number of features to which the priorities is assigned, to be a default value 0. If the value p is 0, it is indicated that there is no feature assigned to the priorities.

Step S5; Deciding of Additional Feature and p+1 Dimensional Reference Vector Subsequently, the recognition dictionary generating section 8 decides an additional feature to be assigned to a next priority ((p+1)-th priority) and (p+1)-dimensional reference vector. Specifically, the feature selecting section 3 directly informs the recognition dictionary generating section 8 of the n-dimensional learning vector. The recognition dictionary generating section 8 decides the additional feature to be added as (p+1)-th priority and a (p+1)-dimensional reference vector having (p+1) number of features such that a loss R becomes minimum, based on the n-dimensional learning vector. Here, the loss R is a parameter indicating a degree of risk where the inputted data is recognized to be in a wrong class. If the reference vector of each class is decided, the loss R can be calculated based on data for learning whose class is known.

Step S6; Correction of the Recognition Dictionary

The recognition dictionary correcting section 9 corrects the recognition dictionary 9 based on the (p+1)-dimensional reference vector decided at Step S5. Specifically, with respect to (p+1) number of features in the m number of features included in the m-dimensional reference vector of the recognition dictionary 9, an element value is corrected to be an element value of the (p+1)-dimensional reference vector. Specifically, when (1, 0, 0, 0) is set as the m(=4)-dimensional reference vector in the recognition dictionary 9 and (2,4) is calculated as the (p+1)-dimensional reference vector, the m-dimensional reference vector is corrected to (2, 4, 0, 0).

Step S7; Correction Of Feature Selecting Table

The feature selecting table generating section 7 corrects the feature selecting table 6, by assigning (p+1)-th priority to the additional feature decided by the recognition dictionary generating section 8.

Step S8; Increment of p

After the feature selecting table 6 is corrected, the value p is incremented.

Step S9; p<m?

If the value p is smaller than a predetermined number m (a number of dimensions that are selected during feature selection), operations following Step S5 are repeated again. On the other hand, if the value p reaches the number m, the value p is not incremented, and the operation is finished. Namely, the value p is incremented until [p+1=m] is established.

By the operations according to Step S1 to 9 mentioned above, the feature selecting table 6 and the recognition dictionary 9 is generated. According to the method mentioned above, the feature selecting table 6 is generated by adding additional features one by one according to the order of the priorities. Here, by Step S5, the additional feature is decided such that the loss R becomes the minimum. Further, at Step S6, the recognition dictionary 9 is corrected based on the (p+1)-dimensional reference vector. When using the feature selecting table 6 and recognition dictionary 9 generated by such method, m number of features are always selected such that loss R becomes the minimum. Further, element values of the m-dimensional reference vector, which is used for recognition, are set such that the loss R in the m-dimension becomes the minimum. Namely, the priorities in the feature selecting table 6 and the reference vector in the recognition dictionary 9 are optimized for a dimension (m-dimension) after feature selection. Accordingly, recognition can be precisely executed while suppressing calculation amounts.

Subsequently, details of the operation at Step S5 will be described.

At Step S5, the recognition dictionary generating section 8 calculates the loss R in a case where an additional feature candidate is added as (p+1)-th priority, by the loss calculating section 83. The additional feature candidate is selected from a feature group (hereinafter, an additional candidate feature group) whose priority is not determined among the n number of features, by the additional feature candidate selecting section 82. Further, in the recognition dictionary generating section 8, the reference vector candidate setting section 81 calculates the loss R while changing a candidate of the (p+1)-dimensional reference vector of the each class. Namely, the loss calculating section 83 calculates the loss R, with respect to each of all combinations of the additional feature candidate and (p+1)-dimensional reference vector candidate. Then, the deciding section 84 calculates (searches) a combination of the additional vector candidate and the reference vector candidate of which the loss R becomes the minimum. The deciding section 84 corrects the recognition dictionary 9 based on the (p+1)-dimensional reference vector candidate that is a search result. Further, the additional feature candidate of the search result is decided as the additional feature. In this time, the deciding section 84 searches the best element value, with respect to each of all features (p+1 number of features) in the (p+1)-dimensional reference vector candidate.

For further detailed explanation, a case will be considered, where the priorities have been assigned to p number of features in the n number of features. Namely, a case where the priorities up to p-th have been determined will be considered. The recognition dictionary generating section 8 operates to decide a feature to be assigned to (p+1)-th priority. Specifically, the additional feature candidate selecting section 82 selects an additional feature candidate. Furthermore, the reference vector candidate selecting section 81 sets (p+1)-dimensional reference vector for each class. Further, the loss calculating section 83 generates (p+1)-dimensional learning vector from the n-dimensional learning vector, with assuming that the feature selecting table 6 is used to which the additional feature candidate selected as (p+1)-th is added. Then the loss calculation section 83 calculates the loss R based on the (p+1)-dimensional learning vector, with assuming that (p+1)-dimensional reference vector candidates are used as the reference vectors. Then, the reference vector candidate setting section 81 changes (p+1)-dimensional reference vectors. Namely, element values of the (p+1)-dimensional reference vector candidates are changed. Then the loss calculation section 83 calculates the loss R again, with assuming that the reference vectors after changing are used. In this way, the loss calculation pat 83 calculates the loss R, with respect to all conceivable reference vector candidates. After that, the additional feature candidate selecting section 82 changes the additional feature candidate. Then, the loss calculation section 83 calculates the loss R again, with respect to all conceivable reference vector candidates. By repeating such calculation, the loss R is calculated, with respect to all combinations of the reference vector candidates and additional feature candidates. After that, the deciding section 84 searches a combination whose loss R is the minimum within the combinations. The deciding section 84 informs the feature selecting table generating section 7 of the additional feature candidate that is a search result, as the additional feature. The feature selecting table generating section 7 assigns the informed additional feature to the (p+1)-th priority to correct the feature selecting table 6. Moreover, the deciding section 84 corrects (generates) the recognition dictionary 9 based on the (p+1)-dimensional reference vector that is the search result.

Subsequently, a method for calculating the loss R will be explained. The loss R is a parameter indicating a degree of risk where inputted data is recognized to be in a wrong class. The loss R depends on a values in the reference vectors of a plurality of class. A parameter identifying the reference vectors of the plurality of class is defined as a classifier parameter $\theta$. The loss calculating section 83 calculates the loss $R(\theta)$ according to equation 1.

(Equation 1)

-continued $$R(\theta) = \sum_{a=1}^{C} \frac{P_a}{N_a} \sum_{j=1}^{N_a} r(\vec{x}_{a,j}; \theta) \quad (1)$$

In the equation 1, C is a number of classes, $P_a$ is a prior probability regarding to a-th class, $N_a$ is a number of feature vectors belonging to a-th class, vector $X_{a,j}$ is j-th feature vector belonging to a-th class, and θ is a classifier parameter.

The prior probability $P_a$ is set to be a desired value. For example, when the number of all vectors is N, $P_a$ is set by $P_a=N_a/N$. Here, N is expressed by $N=N_1+\ldots+N_c$.

The function r(•) indicates a degree of a risk where a feature vector given by an argument becomes miss recognition, and returns a larger value when the risk is larger. For example, functions indicated by below equations 2 to 5 can be used as the function r(•). In the below equations 2 to 5, $g_a(x;\theta)$ indicates a discriminant function for calculating a similarity with a-th class, vector $X_{a,j}$ indicates that h-th class is the easiest to be missed.

(Equation 2)

$$r(\vec{x}_{a,j}; \theta) = f(g_h(\vec{x}_{a,j}; \theta) - g_a(\vec{x}_{a,j}; \theta)) \quad (2)$$

(Equation 3)

$$r(\vec{x}_{a,j}; \theta) = f(g_h(\vec{x}_{a,j}; \theta) / g_a(\vec{x}_{a,j}; \theta)) \quad (3)$$

(Equation 4)

$$r(\vec{x}_{a,j}; \theta) = f\left(\frac{g_h(\vec{x}_{a,j}; \theta)}{g_h(\vec{x}_{a,j}; \theta) + g_a(\vec{x}_{a,j}; \theta)}\right) \quad (4)$$

(Equation 5)

$$r(\vec{x}_{a,j}; \theta) = f\left(\frac{g_h(\vec{x}_{a,j}; \theta) - g_a(\vec{x}_{a,j}; \theta)}{g_h(\vec{x}_{a,j}; \theta) + g_a(\vec{x}_{a,j}; \theta)}\right) \quad (5)$$

However, F(•) is an arbitrary monotonically increasing function. Moreover, when an outputted value of the discriminant function is larger, it is indicated that a degree of belonging to the class is larger, namely, the similarity is larger. However, if a distance is used as the discriminant function, it is indicated that the degree of belonging to the class is larger when the outputted value is smaller.

Subsequently, effects of the present exemplary embodiment will be explained.

According to the present exemplary embodiment, correction of the recognition dictionary 9 and the feature selecting table 6 is executed at every time when the feature is added to the feature selecting table 6. Accordingly, a performance of recognition can be advanced with adding the additional feature to the table. With using drawings, details will be explained.

For simplicity, a case will be considered where the number of classes is 2 and a square of Euclidean distance between the inputted vector and the reference vector is used as a parameter of the similarity.

Figure 7:
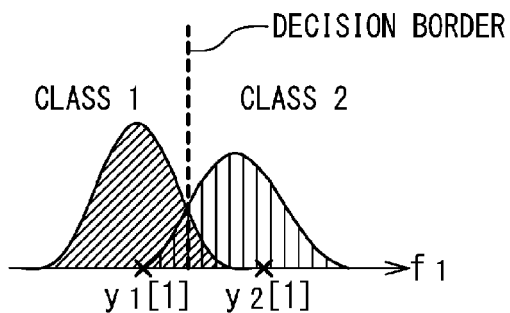
FIG. 7 is an explanation diagram for explaining an effect of the first exemplary embodiment.

FIG. 7 shows an example of data distributions of class 1 and class 2 with respect to feature $f_1$ whose priority is first. y1[1] and y2[1] are feature values of the reference vectors of class 1 and class 2, wherein the feature values correspond to the feature numbers to which first priority is assigned. When the square of Euclidean distance is used as the discriminant function, a decision border is set at middle point between the values of the two reference vectors. Left side and right side of the decision border are recognized as class 1 and class 2, respectively. According to the present exemplary embodiment, the decision border is set on a position such that the loss R becomes the minimum, wherein the loss R corresponds to a total number of data whose class is wrongly recognized.

Figure 8:
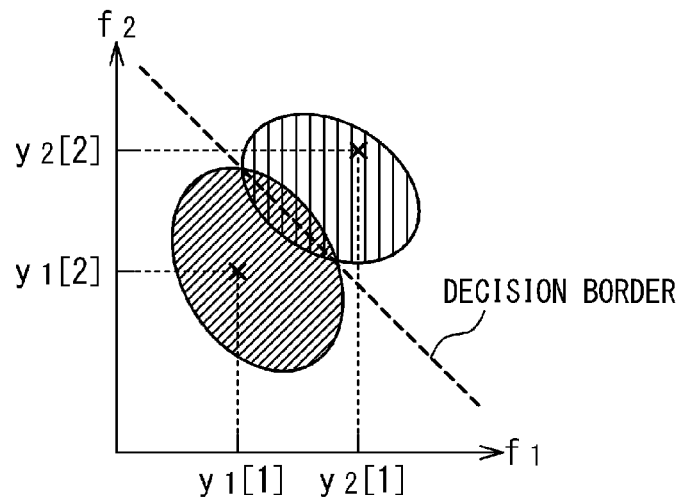
FIG. 8 is an explanation diagram for explaining an effect of the first exemplary embodiment.
Figure 9:
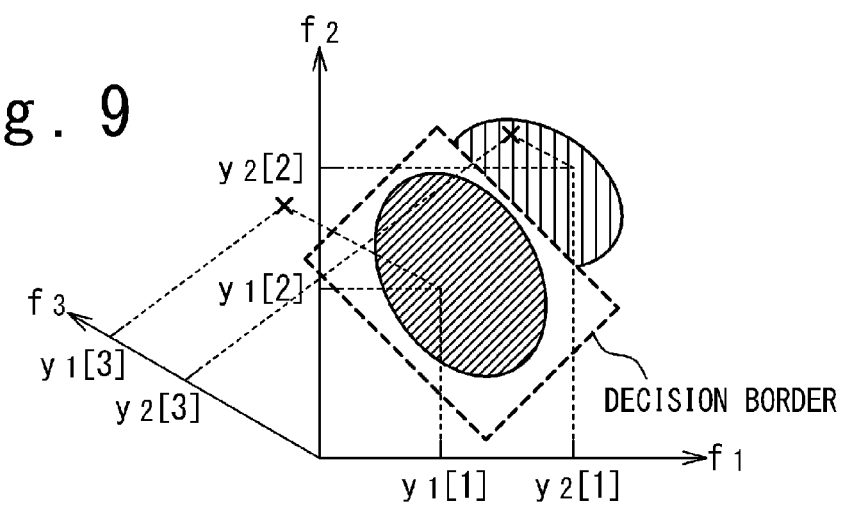
FIG. 9 is an explanation diagram for explaining an effect of the first exemplary embodiment.

FIG. 8 shows an example of data distribution in a case where feature $f_2$ whose priority is second is added. Values ($y_1[1]$ and $y_2[1]$) of reference vectors for the feature whose priority is first and values ($y_1[2]$ and $y_2[2]$) of the reference vectors for the feature whose priority is second are decided at a position (a position shown by x) such that the loss R becomes the minimum. The position of which the loss R becomes the minimum is set in two-dimensional plane made by $f_1$ and $f_2$. Then, the decision border is set at a position shown by a broken line FIG. 9 shows an example of a data distribution in a case where feature value $f_3$ whose priority is third is added. Each of values ($y_1[1]$ and $y_2[1]$) of reference vectors for the feature whose priority is first, values ($y_1[2]$ and $y_2[2]$) of the reference vectors for the feature whose priority is second, and values ($y_1[3]$ and $y_2[3]$) of the reference vectors for the feature whose priority is third are respectively decided at a position (a position shown by x) such that the loss R becomes the minimum. The position of which the loss R becomes the minimum is set in three-dimensional plane made by $f_1$, $f_2$, and $f_3$. Then, the decision border is set at a position shown by a broken line.

Note that the decision border becomes two-dimensional plane when the number of features is 3, that is, in a case of three dimensions. Similarly, the feature selecting table and value of the m-dimensional reference vector are obtained by promoting the operations until the priority becomes m-th.

As mentioned above, according to the present exemplary embodiment, when the feature selecting table 6 is generated, the best (such that the loss R becomes the minimum) additional feature is selected for the each priority. Since the priorities up to m-th feature are decided in such way, the most suitable m number of features are selected when the features are selected. Further, element values of the m-dimensional reference vector are set to be the best values, not for the n-dimensions, but for the m-dimensions. As a result, a high recognition performance can be realized.

Second Exemplary Embodiment

Figure 10:
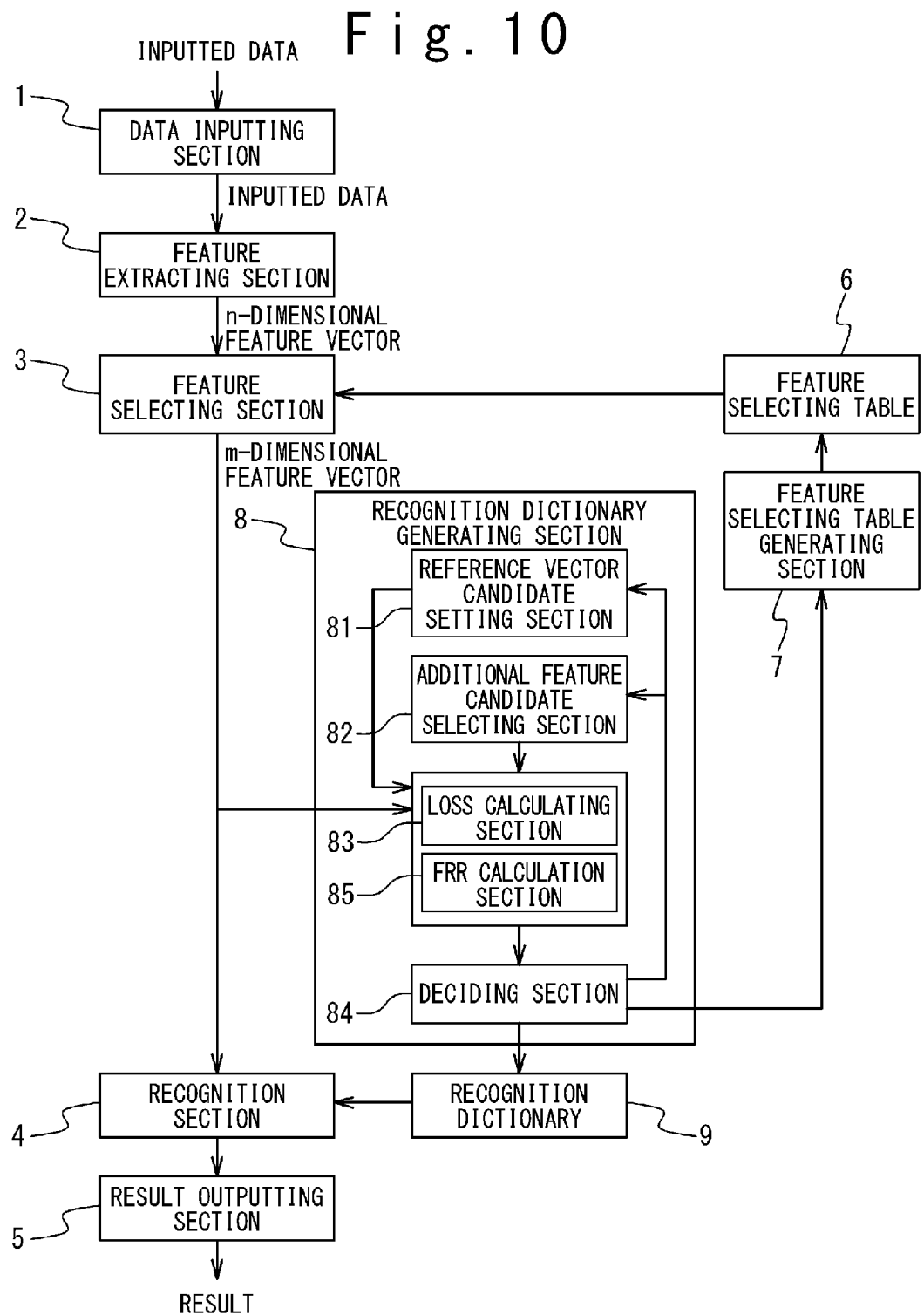
FIG. 10 is a block diagram showing a pattern recognition device according to a second exemplary embodiment.

Subsequently, the second exemplary embodiment according to the present invention will be explained. FIG. 10 is a block diagram showing a pattern recognition device according to the present exemplary embodiment. In the pattern recognition device according to the present exemplary embodiment, an FRR calculating section 85 calculating a False Reject Rate (FRR) is added in the recognition dictionary generating section 8 of the first exemplary embodiment. Further, in the present exemplary embodiment, at least one class of a plurality of class is set to be a set class.

Figure 11:
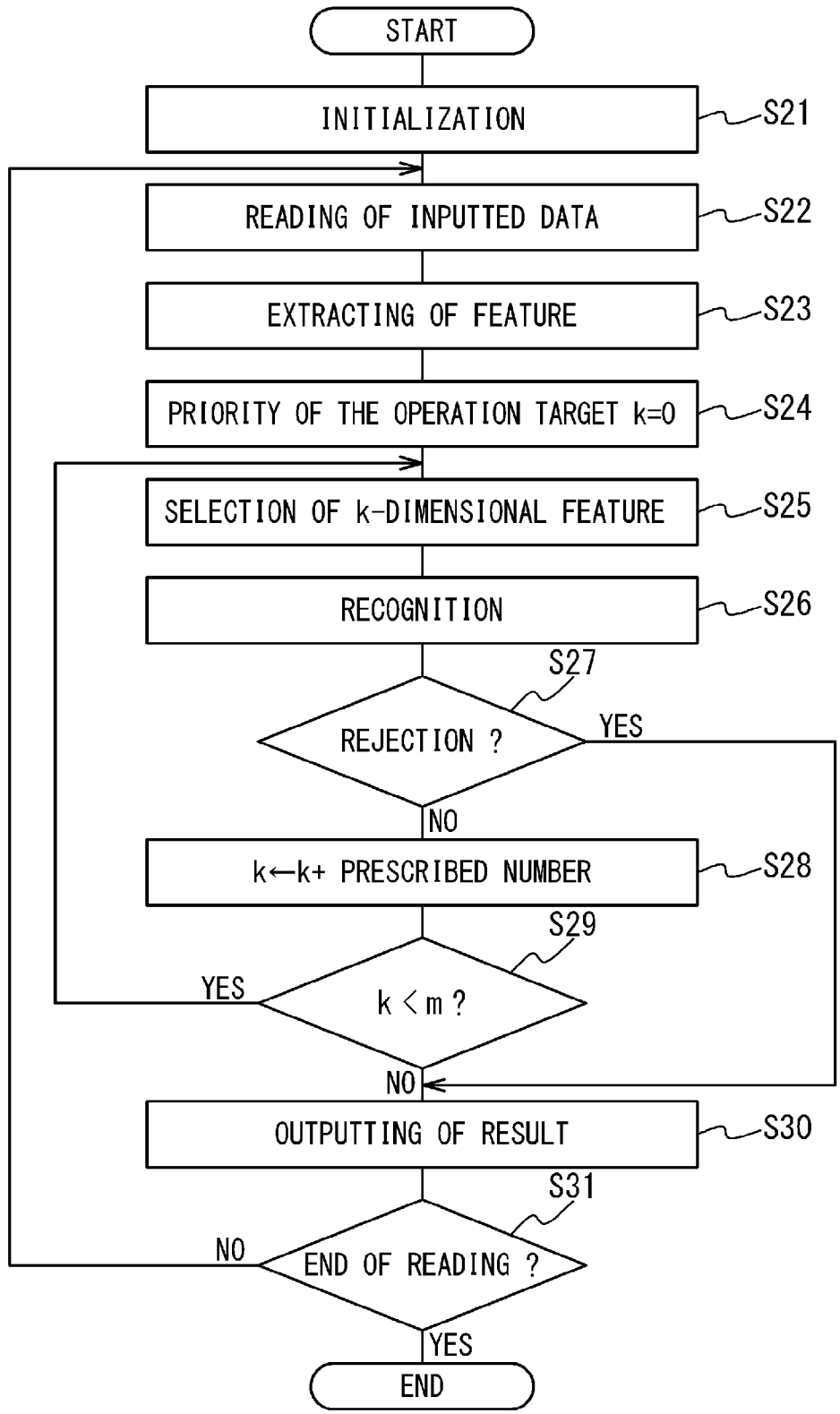
FIG. 11 is a flowchart showing an operation of recognition in the second exemplary embodiment

At first, an operation for recognition in the present exemplary embodiment will be explained. FIG. 11 is a flowchart showing the operation of recognition in the present exemplary embodiment. Unless otherwise noted, operations described blow is carried out by the recognition section 4.

At first, as is the case with the first exemplary embodiment, the feature selecting table 6 and the recognition dictionary 9 are initialized (Step S21). Next, data of recognition target is read as inputted data (Step S22), and n-dimensional inputted vector is generated by the feature extracting section 2 (Step S23).

Next, the feature selecting section 3 sets an operated priority k to be an initial value (Step S24).

Further, the feature selecting section 3 selects a value of feature whose priority is k-th from the n-dimensional inputted vector, based on the feature selecting table 6 (Step S25).

Next, the recognition section 4 references to the recognition dictionary 9, compares the extracted k-th feature value of the n-dimensional inputted vector with a k-th feature value of the reference vector of the each class. Specifically, the recognition section 4 compares by calculating the similarity. Then, the recognition section 4 recognizes which class the n-dimensional inputted vector is the most similar to (Step S26).

Next, the recognition section 4 decides whether or not the n-dimensional inputted vector is rejected. Specifically, the recognition section 4 judges whether or not the set class is the most similar. Then, if the set class is the most similar, it is judged not to be rejected, and if a class other than the set class is the most similar, it is judged to be rejected (Step S27).

If the set class is the most similar (in a case of not rejecting), the recognition section 4 increments a value of k (Step S28), and compares the value k and the value m (Step S29). If K<m, the operations following Step S25 is repeated. If k=m, the set class is outputted as a recognition result (Step S30).

At Step S27, if the inputted vector is the most similar to a class (non set class) other than the set class, the recognition section 4 judges to reject. The recognition section 4 informs the result outputting section 5 of the fact of rejection (Step S30).

By the operations from Step S21 to S30, recognition for one recognition data is executed. After that, it is judged whether or not there is other recognition data (Step S31), and if the other recognition data exists, the operations after Step S22 are repeated. If the other recognition data does not exist, the whole operations are finished.

For example, the recognition method according to the present exemplary embodiment is effective in a case of detecting a certain object in an image. It is often the case that an area of the object is smaller than an area of a whole image. Namely, it is often the case that a most region of the image is a non-object region such as back ground. When detecting the object, the whole image is divided into small regions, and a feature vector is calculated for each small region. Then, the each small region is identified whether an object region or a non-object region. If the present exemplary embodiment is applied, the each small region that is a recognition target is rejected as a non-object region, when being judged not to be the object region. Accordingly, there is no need to continue recognition operation for the rejected each small region. Namely, there is no need to recognize a class of the non-object region. A calculation amount for detecting the object region in the whole image can be reduced, and processing time can be reduced.

Figure 12:
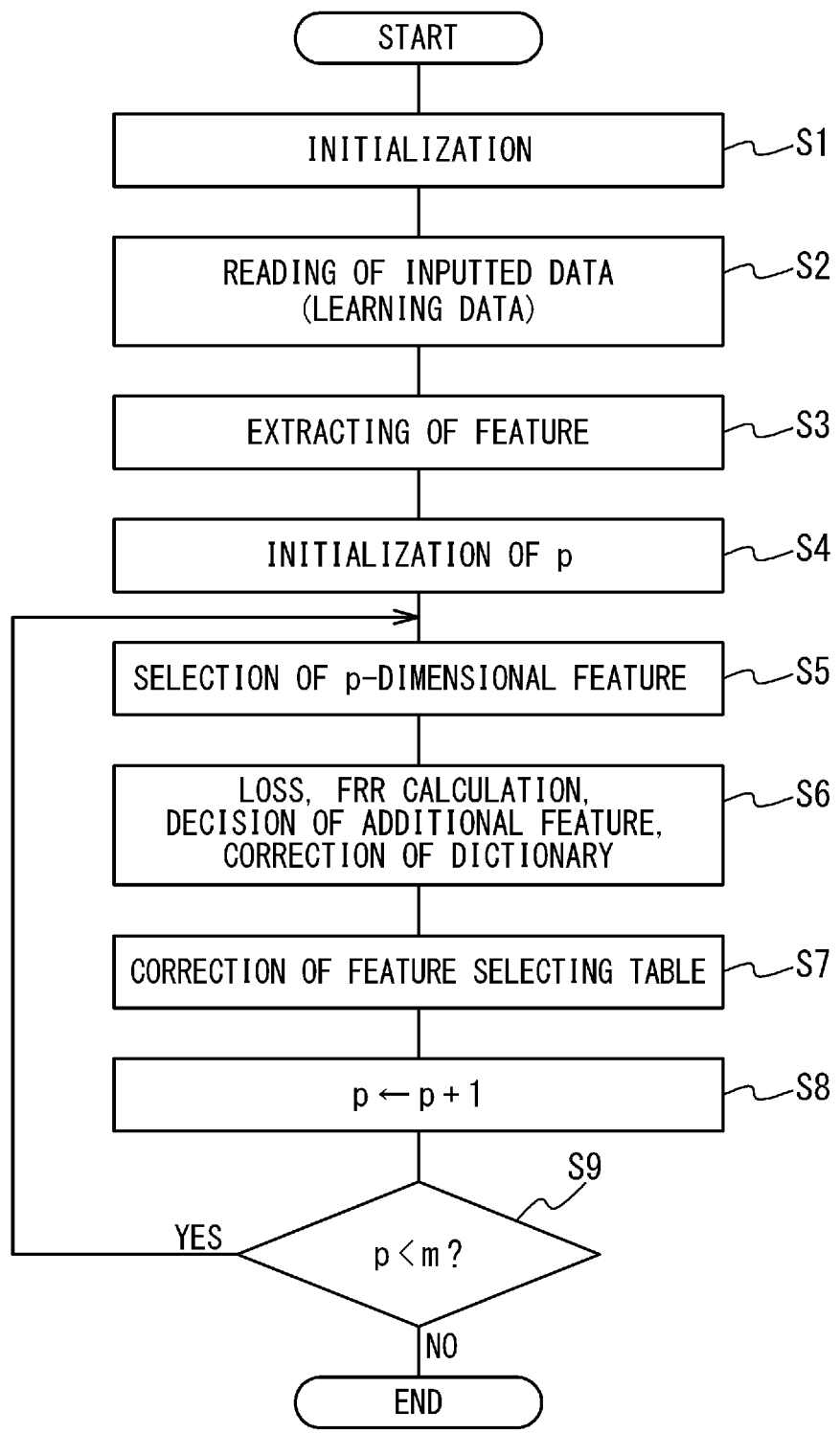
FIG. 12 is a flowchart showing an operation of learning in the second exemplary embodiment.

Next, an operation of learning according to the present exemplary embodiment will be explained. FIG. 12 is a flowchart showing the operation of learning according to the present exemplary embodiment.

A plurality of pattern for learning are prepared. Moreover, the feature selecting table 6 and the recognition dictionary 9 are initialized by the recognition dictionary generating section 8 and the feature selecting table generating section 7. (Step S1).

Subsequently, each of the plurality of pattern for learning is read as inputted data (Step S2). The feature extracting section 2 executes feature extracting for the inputted data, and generates n-dimensional learning vector (Step S3).

Next, the feature selecting table generating section 8 sets value p to be an initial value 0, wherein the value p is a number of the features to which the priorities have been assigned.

Next, the feature selecting section 3 selects p number of dimensions from the n-dimensional learning vector based on the feature selecting table 6, and generates p-dimensional learning vector (Step S5).

Next, the operation of Step S6 is carried out. At Step S6, the recognition dictionary generating section 8 decides a feature (additional feature) to be assigned to the (p+1)-th priority such that the loss $R(\theta)$ becomes the minimum. Moreover, the recognition dictionary generating section 8 decides (p+1)-th feature value of the reference vector of the each class such that the loss $R(\theta)$ becomes the minimum. At this time, in the recognition dictionary generating section 8, the additional feature candidate selecting section 82 selects one additional feature candidate from the additional feature candidate group, as is the case with the exemplary embodiment mentioned above. On the other hand, unlike the exemplary embodiment mentioned above, the reference vector candidate setting section 81 adds the additional feature candidate to the p-dimensional reference vector to set as the (p+1)-dimensional reference vector candidate. That is to say, the reference vector candidate setting section 81 sets values same as the p-dimensional reference vector with respect to features whose priorities are equal to or less than p, and sets new value only for a feature whose priority is (p+1)-th. For example, when p(=3)-dimensional reference vector is (1, 2, 5), (1, 2, 5,T) is set as the (p+1)-dimensional reference vector candidate. Here, T is a value of the additional feature candidate. After that, the loss calculation section 84 calculates the loss $R(\theta)$.

Furthermore, in the present exemplary embodiment, when the loss $R(\theta)$ is calculated, a false reject rate for the set class is also calculated by the FRR calculation section 85. The false reject rate for the set class means a probability that inputted data of the set class is wrongly rejected. Similar to the loss $R(\theta)$, if reference vectors of a plurality of class are decided, the false reject rate FRR can be calculated based on a learning vector whose class is known.

Then, the deciding section 84 searches an additional feature candidate and an reference vector candidate such that the loss $R(\theta)$ becomes the minimum, under a condition where the false reject rate is equal to or less than a target value FRR* that is previously set. Then, the search result is decided to the additional feature and the reference vector. At this time, with respect to the reference vector, substantially, only an element value of a feature to be assigned to (p+1)-th priority is decided. The recognition dictionary generating section 8 sets a value of the reference vector decided by the deciding section 84 as the element value of the (p+1)-th feature of the reference vector of the each class.

Next, an operation of Step S7 is carried out. The feature selecting table generating section 7 assigns the additional feature decided by the recognition dictionary generating section 8 to the (p+1)-th priority, and corrects the feature selecting table 6 (Step S7).

Subsequently, the feature selecting table generating section 7 increments the value p (Step S8). The feature selecting table generating section 7 compares the value p and value m (Step S9). If p<m, the operations following Step S5 is repeated, and if P=m, the operations are finished.

Details of the operation at Step S6 will be explained below. At Step S6, the loss calculation section 83 calculates the loss $R(\theta)$ according to the equation (equation 1) same as the exemplary embodiment mentioned above. Further, the FRR calculation section 85 calculates the false reject rate FRR according to the below equation 6, with respect to the set class.

(Equation 6)

$$S_a(\theta) = \frac{1}{N_a}\sum_{j=1}^{N_a} s(\vec{x}_{a,j}; \theta) \qquad (6)$$

In the above equation 6, $N_a$ is a number of the feature vector belonging to a-th class, vector $X_{a,g}$ is j-th feature vector belonging to a-th class, $\theta$ is a classifier parameter stored as the recognition dictionary 9, and $Sa(\theta)$ is a FRR with respect to a-th class. $S(\bullet)$ is a function, wherein the function returns 0 when vector is correctly recognized, and returns 1 when the vector is wrongly recognized.

Further, an operation at Step S6 will be explained, wherein the operation is to calculate the classifier parameter $\theta$ (reference vector of each class) such that the loss $R(\theta)$ is the minimum under a condition where the false reject rate FRR is equal to or less than a target value that is previously set. For example, such classifier parameter $\theta$ can be calculated by a function $F(\theta)$ represented by bellow equation 7, with using $\lambda$ that is a sufficiently large number. Namely, the classifier parameter $\theta$ may be calculated such that the function $F(\theta)$ represented by bellow equation 7 becomes the minimum.

(Equation 7)

$$F(\theta)=R(\theta)+\lambda(S_a(\theta)-\text{FRR}^*)^2 \qquad (7)$$

Next, effects of the present exemplary embodiment will be explained.

In the present exemplary embodiment, as is the case with the exemplary embodiment mentioned above, correction of the recognition dictionary 9 and correction of the feature selecting table 6 are carried out at every time the feature is added to the table. Accordingly, a recognition performance can be increased with adding the feature to the feature selecting table.

Further, in the present exemplary embodiment, with respect to the features to which the priorities have been already assigned, a value of the reference vector candidate is not changed when generating the recognition dictionary. Accordingly, calculation of the similarity can be efficiently carried out at the time of recognizing. Details about this point will be explained below.

As an example, it is assumed that m-dimensional reference vector group are used as the recognition dictionary 9, and a square of Euclidean distance is used as a parameter of the similarity. The similarity D of m-dimensional vectors can be defined as following equation 8.

(Equation 8)

$$D = \sum_{i=1}^{m}(x[i]-y[i])^2 \qquad (8)$$

In the equation 8, $x[i]$ and $y[i]$ are inputted vector based on recognition data and a value of i-th feature of the reference vector, respectively. Further, when a feature number corresponding to the priority k in the feature selecting table 6 is represented as $i[k]$, the equation 8 can be rewrote to following equation 9.

(Equation 9)

$$D = \sum_{p=1}^{m}(x[i[p]]-y[i[p]])^2 \qquad (9)$$

When the similarity between the inputted vector and the reference vector for the features whose priorities are 1 to q (q<m) is described as d [q], the similarity d [q+1] where the 1st to (q+1)-th features are used is described as following equation 10.

(Equation 10)

$$d[q+1]=d[q]+(x[i[q+1]]-y[i[q+1]])^2 \qquad (10)$$

Namely, when the similarities d[q] up to the priority q have been calculated, the similarity d[q+1] of the priority (q+1) can be obtained only by adding a square of a distance of a feature value corresponding to the priority (q+1) to the similarity d[q]. Accordingly, there is no need to calculate distances with respect to the priorities 1 to q, again. When calculating according to the recurrence formula 10, d[m] becomes same as D represented by the equation 9. As a precondition for realizing such efficient calculation of the distance, a value (y[1] to y[q]) of each feature of the reference vector at a time of calculating the distance of the priority (q+1) should be same as a value at a time of calculating the distance of the priority q. In the present exemplary embodiment, with respect to features to which the priorities have been already assigned, values of the reference vector are not changed. As a result, efficient calculation of distance can be realized. Here the square of Euclidean distance was exemplified as the parameter of the similarity, but it is also effective in a case of using other parameter, such as an inner product, as the parameter of the similarity.

Furthermore, according to the present exemplary embodiment, the additional feature and the reference vector are decided under a condition where the FRR is equal to or less than the target value FRR*. By this, the recognition performance can be increased with suppressing the FRR to be a desired value. Details about this point will be explained below.

For simplicity, it is assumed that the number of classes is 2, and 1st class is set as the set class. Further, it is assumed that the square of Euclidean distance between the inputted vector and the reference vector is used as the parameter of the similarity.

Figure 13:
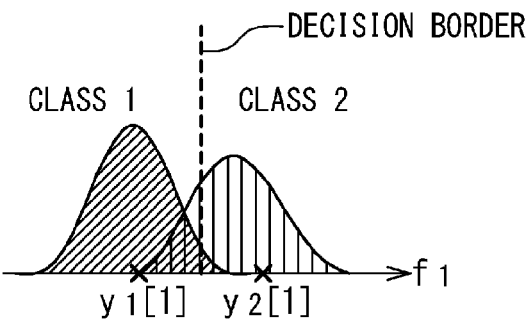
FIG. 13 is an explanation diagram for explaining an effect of the second exemplary embodiment.

FIG. 13 shows an example of data distributions of class 1 and class 2 for a value of feature f1 whose priority is 1st. In FIG. 13, $y_1[1]$ and $y_2[1]$ respectively indicate values of reference vectors of class 1 and class 2, wherein the values correspond to a feature number whose priority is 1st. Their positions are shown by "x". When recognizing with using a square of Euclidean distance as the parameter of the similarity, a decision border is set at middle point between values of two reference vectors, as shown by a broken line in FIG. 13. Left side of the decision border is recognized to be in the class 1, and the right side of the decision border is recognized to be in the class 2. According to the present exemplary embodiment, the decision border is set at a position such that the FRR about class 1 that is the set class is equal to or less than the target value FRR*, and that the loss is the minimum.

Figure 14:
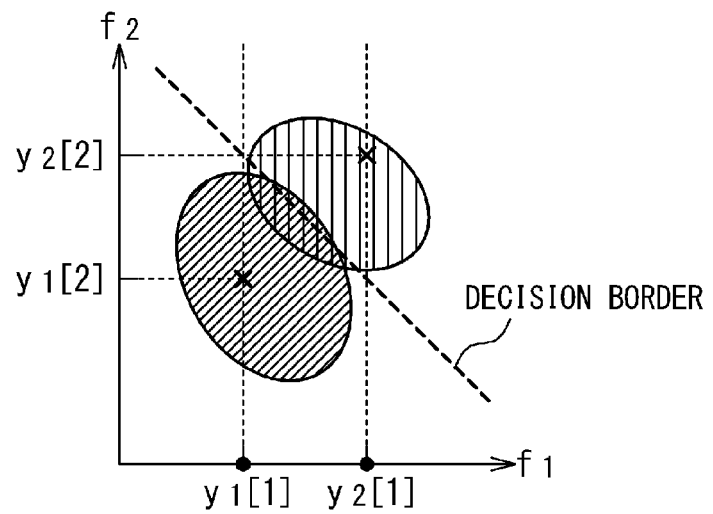
FIG. 14 is an explanation diagram for explaining an effect of the second exemplary embodiment.

FIG. 14 shows an example in which a value $f_2$ of a feature whose priority is second is added. The values ($y_1[1]$ and $y_2[1]$) of the feature whose priority is 1st are not changed in the reference vectors. The values ($y_1[2]$ and $y_2[2]$) of the feature whose priority is second in the reference vectors are set on lines extending from positions of y1[1] and y2[1] (positions shown by black circles in FIG. 14). Further, a positions (position shown by x), at which the FRR about class 1 is equal to or less than the target value FRR* and the loss becomes the minimum, are calculated, and a decision border is set at a position shown by a broken line.

Figure 15:
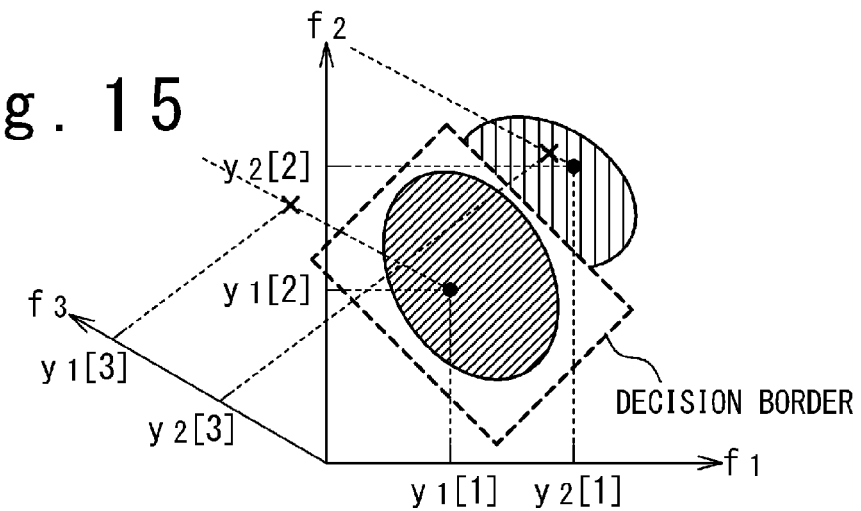
FIG. 15 is an explanation diagram for explaining an effect of the second exemplary embodiment.

FIG. 15 shows an example in which a value $f_3$ of a feature whose priority is third is added. Values of features ($y_1$[1] and $y_2$[1]) whose priority is 1st and values of features (y1[2] and $y_2$[2]) whose priority is second in the reference vectors are fixed. Values ($y_1$[3] and $y_2$[3]) of third feature in the reference vectors are set on lines extending from positions of (y1[1],y1 [2]) and (y2[1],y2[2]) (positions shown by black circles in FIG. 15). On this line, positions (positions shown by X) is obtained, at which the FRR about class 1 is equal to or less than the target value FRR* and the loss is the minimum, and a decision border is set on a position surrounded by a broken line. Not that when the number of features is 3, namely, 3 dimensions, the decision border becomes 2-dimensional plane. Similarly, the feature selecting table 6 and values of the m-dimensional reference vector are obtained by promoting the operations until the priority becomes m-th.

Advantage of setting the FRR to be a desired value (target value FRR*) will be explained below. For example, when detecting an object in an image, it is often the case that an area of the object is smaller than an area of the whole image. Namely, most region of the image is an non-object region such as a background. When detecting the object, a whole image is divided into small regions, a feature vector is calculated for each small region, and the each small region is recognized to be whether an object region or a non-object region. At this time, since a time for a recognition operation of the non-object region is reduced, an operation time for detecting the object in the whole image can be reduced. At FIG. 13 to FIG. 15, if the object is class 1 and the non-object is class 2, it is desired that a probability of wrongly recognizing the class 1 as the class 2, namely FRR, is low. In the present exemplary embodiment, the FRR about the object can be set to a desired value. Further, at a time of recognition, recognition is carried out with increasing the number of features according to the priorities. Here, when the inputted vector is recognized as the non-object (not object), addition of the feature to be recognized is stopped. Namely, the inputted vector is rejected. Accordingly, detection of object can be carried out with speed, without decreasing the accuracy of recognition.

Example According to the First Exemplary Embodiment

Example 1

For a detailed explanation for the exemplary embodiments, examples will be explained.

It is assumed that the number of classes is 2, one reference vector is used for one priority of one class, and a square of Euclidean distance is used as a parameter of the similarity (discriminant function).

Figure 16:
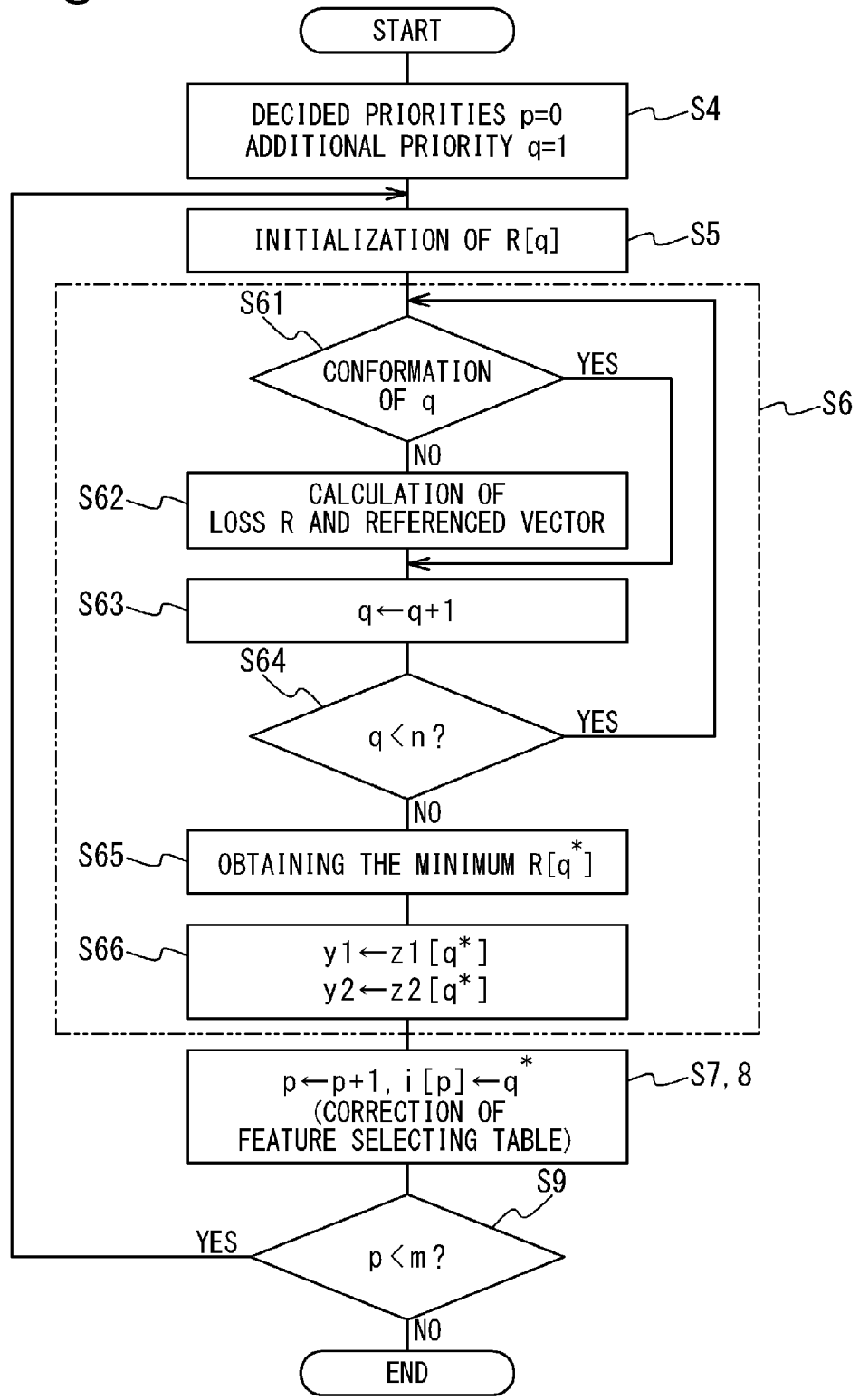
FIG. 16 is a flowchart showing an operation of learning in an example 1.

FIG. 16 is a flowchart of learning in the present example.

At first, before learning, a plurality of data for learning is prepared. Each of the plurality of data for learning is converted into n-dimensional feature vector (herein after, called as n-dimensional learning vector) by the feature extracting section 2. A number of learning vector belonging to the class 1 is defined as N1, and j-th learning vector is described as (x1[j][1], x1[j][2] . . . , x1[j][n]). Similarly, a number of learning vector belonging to the class 2 is defined as N2, and j-th learning vector is described as (x2[j] [1], x2[j][2] . . . , x2[j][n]). As prior probabilities of the class 1 and class 2 (P1 and P2), desired values are set. For example, P1 and P2 are respectively set by P1=N1/N and P2=N2/N. Here, N is a total number of the learning vectors, and N is N1+N2. A value m (m<n) indicating a number of dimensions after selection is set to be a desired value. As the recognition dictionary 9 about the class 1, m-dimensional reference vector (y1[1], y1[2], . . . , y1[m]) is prepared, and m-dimensional reference vector (y2 [1], y2[2], . . . , y2 [m]) is prepared as the recognition dictionary 9 about the class 2. Each element value of each reference vector is set to be an initial value 0. As the feature selecting table 6, m number of combination (i[1],i[2], . . . , i[m]) is prepared, and value of each element is set to be an initial value 0.

The operations mentioned above is corresponding to the operations at Step S1 to Step S3 in FIG. 6.

Subsequently, learning is executed. Unless otherwise noted, following operations are executed by the recognition dictionary generating section 8.

At first, a value p indicating a number of features assigned to the priorities is set to be an initial value 0. Further, a value q indicating a feature number to be selected as the additional feature candidate is set to be an initial value 1 (Step S4).

Subsequently, with respect to each of the feature numbers 1 to n, loss R (q) of a case where the feature is assigned to (p+1)-th priority as the additional feature is set to be an initial value. As the initial value of the loss R (q), the maximum value of the loss (R) which is previously obtained is set (Step S5).

Subsequently, with respect to each of first to m-th priorities in the feature selecting table 6, it is confirmed whether or not the feature number q corresponding to the additional feature candidate has been already assigned to the priority (Step S61).

If there is no priority assigned to the feature of the feature number q at Step S61, the loss R in a case where the feature number q is added to the feature selecting table 6 and reference vectors of class 1 and class 2 (z1[q][1], z1[q][2], . . . , z1[q][m]) and (z2[q][1], z2[q][2], . . . , z2[q][m]) which give the minimum value of the loss R are calculated. The calculated reference vectors are related to the feature number q to be stored (Step S62).

Next, a value q is incremented (Step S63).

Next, the value of q is compared with n (Step S64). When q<n, operations following Step S61 are repeated.

If the value q is equal to n at Step S64, a feature number q* is calculated in which the minimum value of the loss (R) becomes the minimum in the feature numbers 1 to n (Step S65).

Then, a reference vector (z1[q*][1], z1[q*][2], . . . , z1[q*] [m]) of the class 1 corresponding to the feature number q* is stored as the recognition dictionary 9. Similarly, a reference vector (z2[q*][1], z2[q*][2], . . . , z2 [q*] [m]) of the class 2 corresponding to the feature number q* is stored in the recognition dictionary 9 (Step S66).

Further, the recognition dictionary generating section 8 informs the feature selecting table generating section 7 of the feature number q* as a number of the additional feature. The feature selecting table generating section 7 assigns the feature number q* to the (p+1)-th priority, and stores in the feature selecting table 6 (Step S7). The feature selecting table generating section 7 increments a number p of features which is assigned to the priorities.

The recognition dictionary generating section 8 compares p to m (Step S9). If p<m, operations following Step S5 are repeated. If p is equal to m, entire operations are finished.

By the operations up to Step S9, the feature selecting table 6 and the recognition dictionary 9 are generated.

Subsequently, a method of obtaining the loss R at Step S62 will be explained in detail. When calculating the loss R, values of the reference vector candidate of the each class is firstly set, by the reference vector candidate setting section 81. Further, one additional feature candidate is selected from a feature group in which the priority is not assigned within n number of features, by the additional feature candidate selecting section 82. Then, the additional feature candidate is added to the feature selecting table 6, and the loss R is calculated with assuming that the reference vector candidate is used as the reference vector. The loss R is calculated as a sum of a loss element R1 about the class 1 and a loss element R2 about the class 2.

Figure 17:
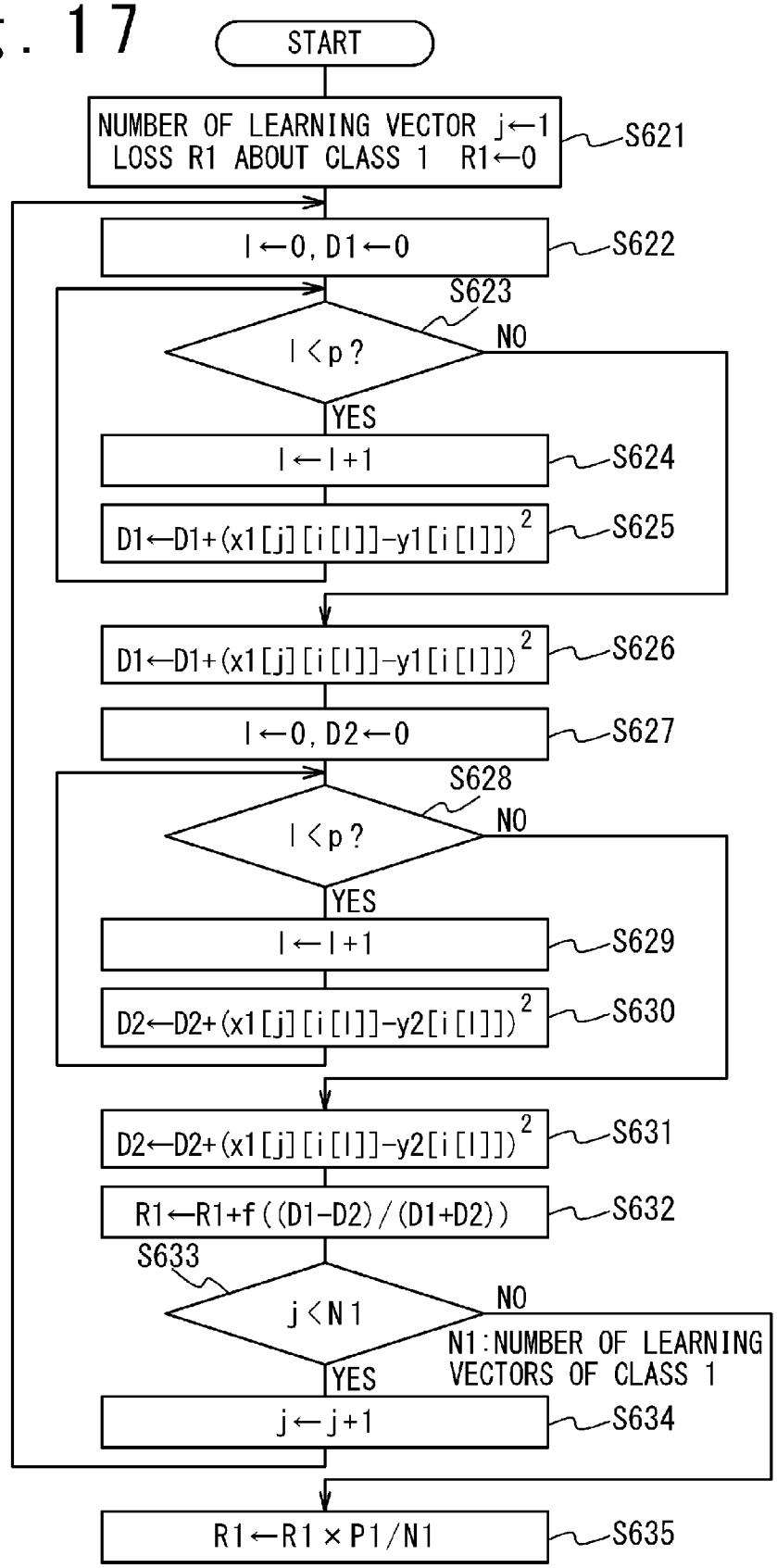
FIG. 17 is a flowchart showing an operation of learning in the example 1.

FIG. 17 is a flowchart showing an operation of calculating the loss element R1 about the class 1.

At first, in the learning vector group of class 1, the number i indicating a learning vector to be operated is set to be an initial value 1. Moreover, a value of the loss element R1 about the class 1 is set to be an initial value 0 (Step S621).

Next, a value of priority 1 of the feature number to be operated is set to be an initial value 0. Further, a value D1 indicating a similarity (distance) between a learning vector to be operated and the reference vector candidate is set to be an initial value 0 (Step S622).

Next, the number of features p to which the priority is assigned is compared to the feature number 1 to be operated (Step S623).

If 1<p at Step S623, the value 1 is incremented by one (Step S624). After that, a square of difference between an element value of the learning vector x1 and an element value of the reference vector y1 about the feature number 1 is calculated, and the calculation result is added to D1 (Step S625). After that, operations following Step S623 are repeated.

If 1=P at step S623, a square of difference between an element value of the learning vector x1 and an element value of the reference vector y1 about the feature number 1 is calculated, and the calculation result is added to D1 (Step S626). After that, following operation of Step S627 is executed.

At Step S627, value 1 is set to be an initial value 0. Further, a value D2 indicating similarity D2 between the learning vector of the operation target and the reference vector candidate is set to be an initial value 0.

Next, the number p of the features to which the priority is assigned is compared with value 1 (Step S628).

When 1<p at Step S628, value 1 is incremented by one (Step S629). After that, a square of difference between an element value of the learning vector x1 and an element value of the reference vector y2 (element value of reference vector candidate of the class 2) about the feature number 1 is calculated, and the calculation result is added to D2 (Step S630). After that, operations following Step S628 are repeated.

When 1=p at Step S628, a square of difference between an element value of the learning vector x1 and an element value of the reference vector y2 about the feature number 1 is calculated, and the calculation result is added to D2 (Step S631). After that, following operation of Step S632 is executed.

At Step S632, the loss is calculated according to definition (function) f(x) previously prepared to be added to R1 (Step S632). As the function f(x), for example, [f(x)=exp($\alpha$x) ($\alpha$ is a positive actual number)] or the like can be used.

Subsequently, number j of the learning vector is compared with the number N1 of the learning vectors of the class 1 (Step S633). If j<N1, value j is incremented (Step S634), and operations following Step S622 are repeated. If J=N1, namely, if operations are finished for all of the leaning vectors of the class 1, the value R1 is corrected based on a prior probability P1 of the class 1 set at a desired value and the number N1 of the learning vectors of the class 1 (Step S635), and the operations are finished.

By the Operations from Step S621 to Step S635 mentioned above, the loss element R1 about the class 1 is calculated. The loss element R2 about the class 2 is calculated with using learning vector group belonging to the class 2, as is the case with the class1. The loss R in a case where one additional feature candidate and one reference vector candidate are used is calculated as a sum of the loss element R1 and the loss element R2. Such calculation of the loss element R is executed for each additional feature candidate in the additional feature candidate group. Further, with respect to each additional feature candidate, the loss R is calculated with changing the reference vector candidate. Then a combination is decided such that the loss R is the minimum in all combinations of the additional feature candidates and the referenced candidates. As a specific method for calculating the reference vector such that the loss R is the minimum, for example, a method is used, wherein the method includes setting each element value of the reference vector to be 8 bit without code and calculating the loss R for all combinations of element values with changing the each element value from 0 to 255.

Figure 18:
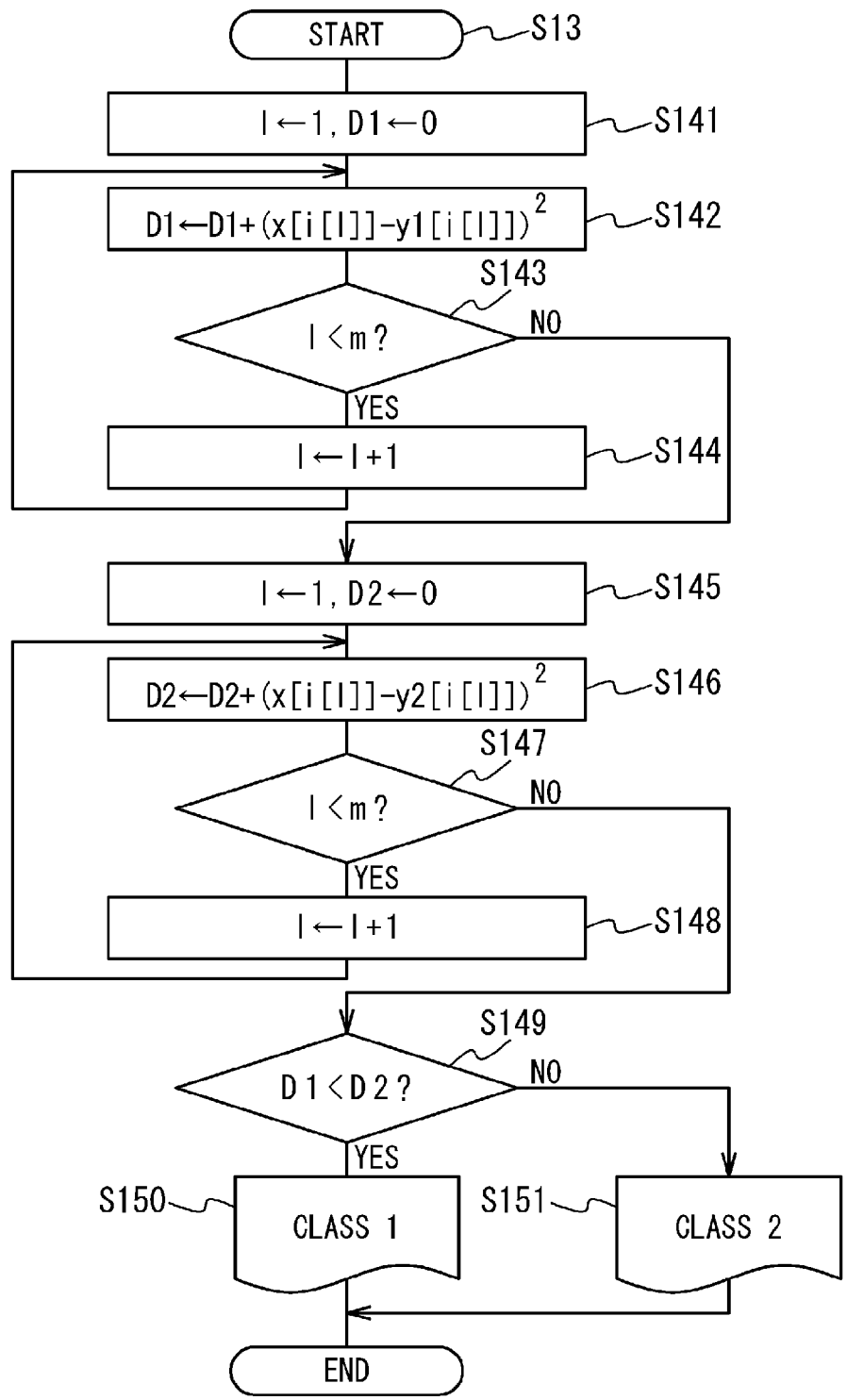
FIG. 18 is a flowchart showing an operation of recognition in the example 1.

Subsequently, an operation of recognition according to the present example will be explained. FIG. 18 is a flowchart showing the operation of recognition according to the present example. Unless otherwise noted, following operations are executed by the recognition section 4.

Recognition target data is converted into an n-dimensional inputted vector (x[1],x[2], . . . , x[n]), by the feature extracting section 2. The n-dimensional inputted vector is converted into an m-dimensional inputted vector, by the feature selecting section 3. The above operations correspond to the operations up to Step S13 in FIG. 5.

Subsequently, value 1 that indicates a priority of the operation target is set to be an initial value 1. Moreover, a value D1 indicating the similarity between the m-dimensional inputted vector and the reference vector of the class 1 is set to be an initial value 0 (Step S141).

Next, with respect to a feature number i[1] that corresponds to 1-th priority in the feature selecting table 6, a square of Euclidean distance between an inputted vector x1 and a reference vector y1 of the class 1 is calculated. The calculation result is added to a value D1 (Step S142).

Next, the value 1 is compared with the value m (Step S143). If 1<m, the value 1 is incremented (Step S144), and operations following Step S142 are repeated. If k=m, following operation of Step S145 is executed.

Next, the value 1 is set to be an initial value 1. Further, a value D2 indicating the similarity between the m-dimensional inputted vector and the reference vector of the class 2 is set to be an initial value 0 (Step S145).

With respect to a feature value i[1] corresponding to 1-th priority in the feature selecting table 6, a square of Euclidean distance between the m-dimensional inputted vector x and the reference vector y2 of the class 2 is calculated. The calculation result is added to the value D2 (Step S146).

Next, the value 1 is compared with the value m (Step S147). If 1<m, the value 1 is incremented (Step S148), and operations following Step S146 are repeated. If 1=m, following operation of Step S149 is executed.

At Step S146, the value D1 is compared with the value D2. If D1<D2, the class 1 is decided as a recognition result (Step S150). If D1>D2, the class 2 is decided as a recognition result (Step S151).

Example According to the Second Exemplary Embodiment

Example 2

Subsequently, in order to explain the second exemplary embodiment in detail, an example 2 will be explained.

As is the case with the example 1, it is assumed that the number of classes is 2, one reference vector is used for each class, and a square of Euclidean distance is used as the parameter of the similarity.

At first, an operation for learning will be explained.

A plurality of inputted data is prepared for learning. Each data for learning is converted into an n-dimensional learning vector by the feature extracting section 2. A number of learning vectors of the class 1 is described as N1, and j-th learning vector is described as (x1[j][1], x1[j][2], . . . , x1[j][n]). Similarly, a number of learning vectors of the class 2 is described as N1, and j-th inputted vector is described as (x2[j][1], x2[j][2], . . . , x2[j][n]). Desired values are set as prior probabilities of the class 1 and the class 2. For example, the prior probability P1 of the class 1 and the prior probability P2 of the class 2 are set as P1=N1/N and P2=N2/N, respectively. The value N is a total number of the inputted vectors, and N=N1+N2 is established. A number m (m<n) of the features selected by the feature selecting section 3 is set to be a desired value. As the recognition dictionary 9 about class 1, one m-dimensional reference vector (y1[1], y1[2], . . . , y1[m]) is set. As the recognition dictionary 9 about class 2, one m-dimensional reference vector (y2[1], y2[2], . . . , y2[m]) is set. Each feature value of each m-dimensional reference vector is set to be an initial value 0. As the feature selecting table 6, m number of combinations (i[1], i[2], . . . , i[m]) are prepared. Each element value in the feature selecting table 6 is set to be an initial value 0.

A flowchart of following operations is same as the example 1 shown in FIG. 16. However, it differs in operations of calculating the minimum loss R and reference vectors of the class 1 and the class 2 (z1[q][1],z1[q][2], . . . , z1[q][m]), (z1[q][1],z1[q][2], . . . , z1[q][m]). Details will be explained below.

At first, a method of calculating the loss R will be explained. Operations for calculating the loss element R1 about the class 1 and the loss element R2 about the class 2 are same as those of the example 1 shown in FIG. 17. However, while the loss R is defined as a sum (R1+R2) of the loss element R1 and the loss element R2 in the example 1, the loss R is defined as R1+R2+λ(S1−FRR*) in the present example. Here, the value λ and FRR are the values previously determined. The value S1 is a false reject rate regarding to the class 1, and is a value calculated by the FRR calculation section 85. The value S1 can be obtained, by reading R1 as S1 and setting P1 to be 1 at Step S635 in the flowchart shown in FIG. 17. Moreover, unlike in the case of the example 1, a function is used as the function f(x) at Step S632, wherein the function returns 1 when the value x is positive, and returns 0 when the value x is negative.

Subsequently, method for changing values of the reference vector will be explained. In the example 1, the values of the reference vector candidates (y1 and y2) were changed with respect to all of features whose priorities are 1st to p-th and (p+1)-th feature, at Step S62 in FIG. 16. On the other hand, in the present example, the element value of the reference vector is not changed in features of 1st to p-th priority, and is changed only for (p+1)-th feature (additional feature candidate).

Subsequently, an operation of recognition in the present example will be explained. FIG. 19 is a flowchart showing the operation of recognition according to the present example.

At first, data of recognition target is read as inputted data, and the feature extracting section 2 generates an n-dimensional inputted vector (x[1],x[2], . . . , x[n]). After that, the recognition section 4 sets value k indicating a priority of the operation target to be an initial value 1, sets distance D1 indicating the similarity between an inputted vector and the class 1 to be an initial value 0, and sets distance D2 indicating the similarity between the inputted vector and the class 2 to be an initial value 0(Step S21 to 25).

Subsequently, the recognition section 4 calculates the similarity (square of Euclidean distance) between the inputted vector x and the reference vector y1 of the class 1, with respect to a feature number i[k] whose priority is k-th in the feature selecting table 6 (Step S26-1). Further, the recognition section 4 calculates the similarity between the inputted vector x and the reference vector y2 of the class 2, with respect to a feature number i[k] to which k-th priority is assigned in the feature selecting table 6 (Step S26-2). Subsequently, the recognition section 4 compares the value D1 and the value D2 (Step S27).

If D1>D2 at Step S27, the recognition section 4 increments the value k (Step S28), and compares the value k with the value m (Step S29). If k<m, operations following Step S26-1 are repeated. If K=m, the recognition section 4 recognizes the class of the inputted vector as the class 1 (Step S30-1).

If D1<D2 at Step S27, the recognition section 4 recognizes the class of the inputted vector as the class 2 (reject) (Step S30-2).

As mentioned above, the example 1 and the example 2 were explained. In the example 1 and the example 2, the cases were explained where the number of classes is 2. However, the present invention is effective even if the number of the classes is greater than 3. Moreover, the present invention is effective even in a case that there are a plurality of reference vector representing one class. Further, as the parameter of the similarity, an inner product or a so-called Gaussian kernel, in which a square of Euclidean distance is obtained to be inputted into an exp function, can be used.

The present invention can be applied to a detection device for automatically detecting an object such as a vehicle or a body in an image or a program for realizing the detection device by a computer.

This patent application claims a priority on convention based on Japanese Patent Application No. 2009-022898. The disclosure of Japanese Patent Application No. 2009-022898 is incorporated herein by reference.

The invention claimed is:

1. A pattern recognition device, comprising:
   a feature extracting section configured to extract n (n is a natural number) number of features from inputted data to generate an n-dimensional feature vector;
   a feature selecting section configured to select m(m<n) number of features from said n-dimensional feature vector based on a feature selecting table indicating a relationship between features and priorities to generate an m-dimensional feature vector;
   a recognition section configured to check said m-dimensional feature vector against a recognition dictionary indicating an m-dimensional reference vector for each of a plurality of class to recognize a class of said inputted data;
a feature selecting table generating section configured to generate said feature selecting table; and
a recognition dictionary generating section configured to generate said recognition dictionary,
wherein said feature selecting table generating section assigns additional features to the priorities one by one to generate said feature selecting table,
wherein when said features are assigned to the priorities up to p-th (p is an integer equal to or larger than 0), said recognition dictionary generating section determines said additional feature to be assigned to (p+1)-th priority and (p+1)-dimensional reference vector having (p+1) number of features such that a loss (R) indicating a degree of risk where said inputted data is identified to be in a wrong class becomes minimum, and determines said m-dimensional reference vector by incrementing said p until [p+1=m] is established.

2. The pattern recognition device according to claim 1, wherein said recognition dictionary generating section comprises:
a reference vector candidate setting section configured to set a candidate of said (p+1)-dimensional referenced vector with respect to said each class;
an additional feature candidate selecting section configured to select an additional feature candidate from an additional feature candidate group to which priorities are not assigned in said n number of features;
a loss calculating section configured to calculate said loss (R) under a condition that a table in which said additional feature candidate is assigned to said (p+1)-th priority is used as said feature selecting table, and that said (p+1)-dimensional reference vector candidate is used as a reference vector; and
a deciding section configured to search said additional feature candidate and said (p+1)-dimensional reference vector candidate such that said loss (R) becomes minimum to decide search result as said additional feature and said (p+1)-dimensional reference vector.

3. The pattern recognition device according to claim 2, wherein said deciding section searches an element value with respect to all of (p+1) number of features included in said (p+1)-dimensional reference vector candidate when searching said (p+1)-dimensional reference vector candidate.

4. The pattern recognition device according to claim 2, wherein said recognition dictionary generating section comprises a FRR calculating section configured to calculate a probability where said inputted data belonging to a set class previously set from said plurality of class is recognized to be in a class other than said set class, as an false reject rate, and
wherein said deciding section searches said additional feature candidate and said (p+1)-dimensional reference vector candidate such that said loss (R) becomes minimum, under a condition that the false reject rate calculated by said FRR calculating section is equal to or less than a target value FRR*.

5. The pattern recognition device according to claim 4, wherein when searching said (p+1)-dimensional reference vector candidate, said deciding section fixes values of features to which first to p-th priorities are assigned to be values same as p-dimensional reference vector, and searches only an element value of said additional feature candidate.

6. The pattern recognition device according to claim 4, wherein said recognition section compares an element value x(k) of a feature whose priority is k-th (k is 1 to m) in said m-dimensional feature vector with an element value y(k) of a k-th feature in a reference vector of said each class, rejects said inputted data when said x(k) is the most similar to said y(k) of a non-set class other than said set class, and recognizes a class of said n-dimensional feature vector to be said set class when said x(k) is most similar to said y(k) of said set class with respect to all of first to m-th features.

7. A pattern recognition method, comprising:
extracting n (n is a natural number) number of features from inputted data to generate an n-dimensional feature vector;
selecting m(m<n) number of features from said n-dimensional feature vector based on a feature selecting table indicating a relationship between features and priorities to generate an m-dimensional feature vector;
checking said m-dimensional feature vector against a recognition dictionary indicating an m-dimensional reference vector for each of a plurality of class to recognize a class to which said inputted data belongs;
generating said feature selecting table; and
generating said recognition dictionary,
wherein said generating feature selecting table comprises assigning additional features to a plurality of priorities one by one to generate said feature selecting table,
wherein said generating recognition dictionary comprises:
determining said additional feature to be assigned to (p+1)-th priority and (p+1)-dimensional reference vector having (p+1) number of features such that a loss (R) indicating a degree of risk where said inputted data is identified to be in a wrong class becomes minimum, when said features are assigned to priorities up to p-th (p is an integer equal to or larger than 0); and
determining said m-dimensional reference vector by incrementing said p until [p+1=m] is established.

8. The pattern recognition method according to claim 7, wherein said generating recognition dictionary comprises:
setting a candidate of said (p+1)-dimensional referenced vector with respect to said each class;
setting an additional feature candidate from an additional feature candidate group to which priorities are not assigned in said n number of features;
calculating said loss (R) under a condition that a table in which said additional feature candidate is assigned to said (p+1)-th priority is used as said feature selecting table, and that said (p+1)-dimensional reference vector candidate is used as a reference vector;
searching said additional feature candidate and said (p+1)-dimensional reference vector candidate such that said loss (R) becomes minimum; and
deciding search result as said additional feature and said (p+1)-dimensional reference vector.

9. The pattern recognition method according to claim 8, wherein said deciding comprises searching an element value with respect to all of (p+1) number of features included in said (p+1)-dimensional reference vector candidate when searching said (p+1)-dimensional reference vector candidate.

10. The pattern recognition method according to claim 8, wherein said generating recognition dictionary comprises calculating a probability where said inputted data belonging to a set class previously set from said plurality of class is recognized to be in a class other than said set class, as an false reject rate, and
wherein said deciding comprises searching said additional feature candidate and said (p+1)-dimensional reference vector candidate such that said loss (R) becomes minimum, under a condition that the false reject rate calculated by said FRR calculating section is equal to or less than a target value FRR*.

11. The pattern recognition method according to claim 10, wherein said deciding comprises fixing values of features to which first to p-th priorities are assigned to be same values as p-dimensional reference vector to search only an element value of said additional feature candidate, when searching said (p+1)-dimensional reference vector candidate.

12. The pattern recognition method according to claim 10, wherein said checking comprises:
   comparing an element value x(k) of a feature whose priority is k-th (k is 1 to m) in said m-dimensional feature vector with an element value y(k) of a k-th feature of a reference vector of said each class;
   rejecting said inputted data when said x(k) is the most similar to said y(k) of a non-set class other than said set class; and
   recognizing a class of said n-dimensional feature vector to be in said set class when said x(k) is the most similar to said y(k) of said set class with respect to all of first to m-th features.

13. A non-transitory computer-readable-recording medium in which a computer-executable program code is stored to attain a pattern recognition method, which comprises:
   extracting n (n is a natural number) number of features from inputted data to generate an n-dimensional feature vector;
   selecting m(m<n) number of features from said n-dimensional feature vector based on a feature selecting table indicating a relationship between features and priorities to generate an m-dimensional feature vector;
   checking said m-dimensional feature vector against a recognition dictionary indicating an m-dimensional reference vector for each of a plurality of class to recognize a class to which said inputted data belongs;
   generating said feature selecting table; and
   generating said recognition dictionary,
   wherein said generating feature selecting table comprises assigning additional features to a plurality of priorities one by one to generate said feature selecting table,
   wherein said generating recognition dictionary comprises:
   determining said additional feature to be assigned to (p+1)-th priority and (p+1)-dimensional reference vector having (p+1) number of features such that a loss (R) indicating a degree of risk where said inputted data is identified to be in a wrong class becomes minimum, when said features are assigned to priorities up to p-th (p is an integer equal to or larger than 0); and
   determining said m-dimensional reference vector by incrementing said p until [p+1=m] is established.

14. The computer-readable-recording medium according to claim 13, wherein said generating recognition dictionary comprises:
   setting a candidate of said (p+1)-dimensional referenced vector with respect to said each class;
   setting an additional feature candidate from an additional feature candidate group to which priorities are not assigned in said n number of features;
   calculating said loss (R) under a condition that a table in which said additional feature candidate is assigned to said (p+1)-th priority is used as said feature selecting table, and that said (p+1)-dimensional reference vector candidate is used as a reference vector;
   searching said additional feature candidate and said (p+1)-dimensional reference vector candidate such that said loss (R) becomes minimum; and
   deciding search result as said additional feature and said (p+1)-dimensional reference vector.

15. The computer-readable-recording medium according to claim 14, wherein said deciding comprises searching an element value with respect to all of (p+1) number of features included in said (p+1)-dimensional reference vector candidate when searching said (p+1)-dimensional reference vector candidate.

16. The computer-readable-recording medium according to claim 14, wherein said generating recognition dictionary comprises calculating a probability where said inputted data belonging to a set class previously set from said plurality of class is recognized to be in a class other than said set class, as an false reject rate, and
   wherein said deciding comprises searching said additional feature candidate and said (p+1)-dimensional reference vector candidate such that said loss (R) becomes minimum, under a condition that the false reject rate calculated by said FRR calculating section is equal to or less than a target value FRR*.

17. The computer-readable-recording medium according to claim 16, wherein said deciding comprises fixing values of features to which first to p-th priorities are assigned to be same values as p-dimensional reference vector to search only an element value of said additional feature candidate, when searching said (p+1)-dimensional reference vector candidate.

18. The computer-readable-recording medium according to claim 16, wherein said checking comprises:
   comparing an element value x(k) of a feature whose priority is k-th (k is 1 to m) in said m-dimensional feature vector with an element value y(k) of a k-th feature of a reference vector of said each class;
   rejecting said inputted data when said x(k) is the most similar to said y(k) of a non-set class other than said set class; and
   recognizing a class of said n-dimensional feature vector to be in said set class when said x(k) is the most similar to said y(k) of said set class with respect to all of first to m-th features.

* * * * *

UNITED STATES PATENT AND TRADEMARK OFFICE
CERTIFICATE OF CORRECTION

PATENT NO.       : 8,612,370 B2
APPLICATION NO. : 13/147451
DATED            : December 17, 2013
INVENTOR(S)      : Atsushi Sato It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 264 days.

Signed and Sealed this
Twenty-second Day of September, 2015

Michelle K. Lee
*Director of the United States Patent and Trademark Office*